United States Patent
King et al.

(10) Patent No.: US 12,417,644 B1
(45) Date of Patent: *Sep. 16, 2025

(54) TRAFFIC LIGHT IDENTIFICATION AND/OR CLASSIFICATION FOR USE IN CONTROLLING AN AUTONOMOUS VEHICLE

(71) Applicant: Aurora Operations, Inc., Pittsburgh, PA (US)

(72) Inventors: Davis Edward King, Billerica, MA (US); Yan Li, San Francisco, CA (US)

(73) Assignee: Aurora Operations, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,429

(22) Filed: Dec. 19, 2023

Related U.S. Application Data

(63) Continuation of application No. 17/039,479, filed on Sep. 30, 2020, now Pat. No. 11,900,689.

(60) Provisional application No. 63/034,517, filed on Jun. 4, 2020.

(51) Int. Cl.
*G06V 20/58* (2022.01)
*G05D 1/00* (2024.01)
*G06F 18/214* (2023.01)
*G06V 10/22* (2022.01)

(52) U.S. Cl.
CPC ......... *G06V 20/584* (2022.01); *G05D 1/0088* (2013.01); *G05D 1/0251* (2013.01); *G05D 1/0274* (2013.01); *G06F 18/214* (2023.01); *G06V 10/22* (2022.01)

(58) Field of Classification Search
CPC .... G06V 20/584; G06V 10/22; G05D 1/0088; G05D 1/0251; G05D 1/0274; G06F 18/214
See application file for complete search history.

(56) References Cited

U.S. PATENT DOCUMENTS

| | | | |
|---|---|---|---|
| 8,559,673 | B2 | 10/2013 | Fairfield et al. |
| 9,145,140 | B2 | 9/2015 | Ferguson et al. |
| 9,779,314 | B1 | 10/2017 | Wendel et al. |

(Continued)

OTHER PUBLICATIONS

Levinson et al, "Traffic light mapping, localization, and state detection for autonomous vehicles," May 9, 2011 IEEE International Conference on Robotics and Automation, Shanghai, 2011, pp. 5784-5791, doi: 10.1109/ICRA.2011.5979714.

*Primary Examiner* — Amandeep Saini
*Assistant Examiner* — Daniella M. DiGuglielmo
(74) *Attorney, Agent, or Firm* — Gray Ice Higdon

(57) ABSTRACT

Systems and methods for determining a current state, of at least one traffic light, for use in controlling an autonomous vehicle are described herein. Implementations determine, based on a pose instance of the autonomous vehicle and a stored mapping of an environment of the autonomous vehicle, a region of the environment including the traffic light and a configuration that is assigned to the traffic light. Further, those implementations process an image capturing the region, using a machine learning classifier, to generate predicted output associated with multiple candidate states of the traffic light, and determine a current state of the traffic light based on the predicted output. Processing the image using the machine learning classifier can be based on the configuration of the traffic light.

18 Claims, 6 Drawing Sheets

(56) References Cited

U.S. PATENT DOCUMENTS

| | | | |
|---|---|---|---|
| 9,990,548 B2 | 6/2018 | Wellington | |
| 10,346,696 B1* | 7/2019 | Wendel | G06V 20/584 |
| 10,467,487 B1* | 11/2019 | Wang | G06F 18/254 |
| 2013/0253754 A1 | 9/2013 | Ferguson et al. | |
| 2017/0337435 A1 | 11/2017 | Uliyar et al. | |
| 2018/0112997 A1 | 4/2018 | Fasola et al. | |
| 2018/0144203 A1* | 5/2018 | Moosaei | G06V 20/584 |
| 2018/0211120 A1* | 7/2018 | Smith | G06N 20/00 |
| 2018/0211530 A1 | 7/2018 | Sarkar et al. | |
| 2018/0285664 A1 | 10/2018 | Satyakumar et al. | |
| 2020/0134333 A1 | 4/2020 | Vishal et al. | |
| 2020/0410263 A1 | 12/2020 | Gao et al. | |
| 2021/0201057 A1* | 7/2021 | Lin | G06F 18/24 |
| 2021/0350152 A1* | 11/2021 | Chen | G06F 18/217 |
| 2021/0357668 A1* | 11/2021 | Zhu | G08G 1/095 |

\* cited by examiner

TRAFFIC LIGHT IDENTIFICATION AND/OR CLASSIFICATION FOR USE IN CONTROLLING AN AUTONOMOUS VEHICLE

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relates to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

SUMMARY

The present disclosure is directed to particular method(s) and/or architecture(s) for determining a current state, of at least one traffic light, for use in controlling an autonomous vehicle. The current state of the traffic light can be selected from multiple candidate states of the traffic light. Some implementations determine a region of an environment that includes the traffic light. Some of those implementations process, using machine learning classifier(s), an image that captures the region of the environment to generate predicted output associated with the multiple candidate states of the traffic light, and select a given one of the multiple candidate states as the current state based on the predicted output. In some of those implementations, processing the image using the traffic light classifier(s) is further based on a configuration assigned to the traffic light (e.g., a configuration pre-stored in memory in association with the region), where the configuration defines one or more features of the traffic light and is one of multiple disparate configurations in a taxonomy of configurations.

In some of the implementations that use the configuration in processing the image, the configuration is processed, along with the image, using the machine learning classifier(s) (i.e., an indication of the configuration is utilized as an input, along with the image). In some additional and/or alternative implementations that use the configuration in processing the image, the configuration is utilized to select, from a plurality of candidate machine learning classifiers, a machine learning classifier that is particularized to the configuration. Using the configuration in these or other manners can result in generating predicted output that is more accurate and/or more robust (e.g., for suboptimal images) which, in turn, results in more accurate and/or robust prediction of current states of traffic lights.

Therefore, consistent with one aspect of the invention, a method implemented by one or more processors of an autonomous vehicle is described herein. The method may include capturing an original image of an environment of the autonomous vehicle that includes a plurality of traffic lights, and cropping the original image to generate a cropped image including a region of the environment that includes a given traffic light of the plurality of traffic lights. The method may further include processing the cropped image, that captures the region of the environment that includes the given traffic light, to generate predicted output associated with multiple candidate states of the given traffic light. Processing the cropped image may be using a machine learning classifier and may be based on a configuration that is assigned to the given traffic light. The method further includes selecting, based on the predicted output, one of the candidate states as a current state of the given traffic light, and controlling the autonomous vehicle based on the selected current state of the given traffic light.

These and other implementations of technology disclosed herein can optionally include one or more of the following features.

In some implementations, processing the cropped image using the machine learning classifier and based on the configuration that is assigned to the given traffic light may include processing, along with the cropped image and using the machine learning classifier, a configuration indication that corresponds to the determined configuration that is assigned to the given traffic light.

In some implementations, processing the cropped image using the machine learning classifier and based on the configuration that is assigned to the given traffic light may include selecting the machine learning classifier, from a plurality of candidate machine learning classifiers, based on the machine learning classifier corresponding to the determined configuration that is assigned to the given traffic light, and using the machine learning classifier, in processing the image, responsive to selecting the machine learning classifier. In some versions of those implementations, the method may further include, prior to processing the cropped image using the machine learning classifier, selecting a plurality of training instances for training the machine learning classifier. Each of the training instances includes training instance input that includes corresponding vision data capturing a corresponding traffic light, and training instance output that indicates a corresponding ground truth state of the corresponding traffic light. Further, selecting the plurality of training instances may include selecting the plurality of training instances based on the corresponding traffic lights, captured in the vision data of the training instance inputs of the training instances, conforming to the determined configuration, and training the machine learning classifier using the plurality of training instances.

In some implementations, the configuration that is assigned to the given traffic light may define one or more features of the given traffic light defines one or more features of the given traffic light, and may include an orientation of the given traffic light and/or a bulb pattern of the given traffic light. Further, the configuration that is assigned to the given traffic light may be one of multiple disparate configurations in a taxonomy of configurations.

In some implementations, the method may further include determining, based on a pose instance of the autonomous vehicle and a stored mapping of the environment, that the region of the environment includes the given traffic light. Determining that the region includes the given traffic light may include transforming a stored pose of the given traffic light, in the mapping, and in view of the pose instance of the autonomous vehicle, to determine the region of the environment that includes the given traffic light. In some versions of those implementations, cropping the original image to generate the cropped image may include identifying a portion of the original image to crop based on determining that the portion of the original image encompasses pixels that capture the region of the environment that includes the given traffic light. In some further versions of those implementations, the original image may include an additional region of the environment that includes an additional traffic light of the plurality of traffic lights. The method may further include transforming a stored additional pose of the additional traffic light, in the mapping, and in view of the pose instance of the autonomous vehicle, to determine the additional region of the environment includes the additional traffic light, identifying an additional portion of the original image to crop based on determining that the additional portion of the image encompasses additional pixels that capture the additional region of the environment that includes the additional traffic light, and cropping the original image to generate an additional cropped image based on cropping the additional portion of the original image.

In some further versions of those implementations, the method may further include determining an additional configuration that is assigned to the additional traffic light. The additional configuration may be another one of the multiple disparate configurations in the taxonomy of configurations. The method may further include processing the additional cropped image, that captures the additional region of the environment that includes the additional traffic light, to generate additional predicted output. Processing the additional image may be based on the additional configuration that is assigned to the additional traffic light. The method may further include selecting, based on the additional predicted output, one of the candidate states as an additional current state of the additional traffic light, and controlling the autonomous vehicle may be further based on the selected additional current state of the additional traffic light. In yet further versions of those implementations, processing the additional image based on the additional configuration that is assigned to the additional traffic light may include selecting an additional machine learning classifier, from the plurality of candidate machine learning classifiers, based on the additional machine learning classifier corresponding to the determined additional configuration that is assigned to the additional traffic light, and using the additional machine learning classifier, in processing the additional image, responsive to selecting the additional machine learning classifier. In yet other further versions of those implementations, processing the additional image based on the additional configuration that is assigned to the additional traffic light may include processing, along with the additional image and using the machine learning classifier, an additional configuration indication that corresponds to the determined additional configuration that is assigned to the additional traffic light.

In some implementations, the method may further include determining that the autonomous vehicle is within a threshold distance of the given traffic light based on a pose instance of the autonomous vehicle and a stored pose of the given traffic light in a stored mapping of the environment, and processing the cropped image using the machine learning classifier may be further in response to determining that the autonomous vehicle is within the threshold distance of the given traffic light. In some versions of those implementations, the method further includes determining that the given traffic light is within a threshold range of orientation of the autonomous vehicle based on the pose instance of the autonomous vehicle and an orientation of the given traffic light included in the stored mapping of the environment, and processing the cropped image using the machine learning classifier may be further in response to determining that the given traffic light is within the threshold range of orientation of the autonomous vehicle.

In some implementations, the method further includes, subsequent to cropping the original image to generate the cropped image, modifying the cropped image, using one or more image transformation techniques, to generate a modified cropped image. The one or more image transformation techniques include one or more of rotating the image, scaling the image, or interpolating pixels of the image. Further, processing the cropped image may include processing the modified cropped image.

Consistent with some another aspect of the invention, a method implemented by one or more processors of an autonomous vehicle is described herein. The method may include determining, based on a pose instance of the autonomous vehicle and a stored mapping of an environment, that a region of the environment includes a traffic light, and a configuration that is assigned to the traffic light, the configuration defining one or more features of the traffic light and being one of multiple disparate configurations in a taxonomy. The method may further include, responsive to determining that the region includes the traffic light, processing an image, that captures the region of the environment that includes the traffic light, to generate predicted output associated with multiple candidate states of the traffic light. Processing the image may be using a machine learning classifier and is based on the determined configuration that is assigned to the traffic light. The method may further include, responsive to determining that the region includes the traffic light, selecting, based on the predicted output, one of the candidate states as a current state of the traffic light, and controlling the autonomous vehicle based on the selected current state of the traffic light.

These and other implementations of technology disclosed herein can optionally include one or more of the following features.

In some implementations, the method may further include receiving, from a first vision component of the autonomous vehicle, the image of the region of the environment that includes the traffic light at a first time, and receiving, from a second vision component of the autonomous vehicle, an additional image of the region of the environment that includes the traffic light at or near the first time. The method may further include processing the additional image, that captures the region of the environment that includes the traffic light, to generate additional predicted output associated with the multiple candidate states of the traffic light.

Further, processing the additional image is using the machine learning classifier and is based on the determined configuration that is assigned to the traffic light, and the selecting may be further based on the additional predicted output.

In some implementations, one or more of the features defined by the configuration that is assigned to the traffic light includes an orientation of the traffic light and/or a bulb pattern of the traffic light. In some versions of those implementations, processing the image based on the configuration that is assigned to the traffic light may include processing, along with the image and using the machine learning classifier, a configuration indication that corresponds to the configuration that is assigned to the traffic light. In some other versions of those implementations, processing the image based on the configuration that is assigned to the traffic light may include selecting the machine learning classifier, from a plurality of candidate machine learning classifiers, based on the machine learning classifier corresponding to the configuration that is assigned to the traffic light, and using the machine learning classifier, in processing the image, responsive to selecting the machine learning classifier.

Consistent with yet another aspect of the invention, a traffic light system of an autonomous vehicle is described herein. The traffic light system may include at least one processor, and at least one memory comprising instructions that, when executed, cause the at least one processor to capture an original image of an environment of the autonomous vehicle that includes a plurality of traffic lights, and crop the original image to generate a cropped image including a region of the environment that includes a given traffic light of the plurality of traffic lights. The instructions may further cause the at least one processor to process the cropped image, that captures the region of the environment that includes the given traffic light, to generate predicted output associated with multiple candidate states of the given traffic light. Processing of the cropped image may be using a machine learning classifier and may be based on a configuration that is assigned to the given traffic light. The instructions may further cause the at least one processor to select, based on the predicted output, one of the candidate states as a current state of the given traffic light, and control the autonomous vehicle based on the selected current state of the traffic light.

Consistent with a further aspect of the invention, a method implemented by one or more processors of an autonomous vehicle is described herein. The method may include generating a plurality of training instances, and each of the training instances may include training instance input and corresponding training instance output. The training instance input may include vision data capturing a traffic light, and may include a configuration indication that corresponds to a configuration that is assigned to the traffic light. Further, the corresponding training instance output may include a ground truth state of the traffic light. The method may further include training a machine learning classifier, for use by an autonomous vehicle, based on the plurality of training instances.

These and other implementations of technology disclosed herein can optionally include one or more of the following features.

In some implementations, the configuration that is assigned to the traffic light defines one or more features of the traffic light and is one of multiple disparate configurations in a taxonomy of configurations. In some versions of those implementations, the method may further include generating a plurality of additional training instances, and each of the additional training instances including additional training instance input and corresponding additional training instance output. The additional training instance input may include additional vision data capturing an additional traffic light, and may include an additional configuration indication that corresponds to an additional configuration that is assigned to the additional traffic light. Further, the corresponding additional training instance output may include an additional ground truth state of the additional traffic light. The method may further include training an additional machine learning classifier, for by the autonomous vehicle, based on the plurality of additional training instances. In some further versions of those implementations, the additional configuration that is assigned to the additional traffic light is an additional one of the multiple disparate configurations in the taxonomy of configurations, and the additional configuration that is assigned to the additional traffic light is distinct from the configuration assigned to the traffic light.

In yet further versions of those implementations, the method may further include, subsequent to training the machine learning classifier and the additional machine learning classifier, receiving, from one or more vision components of the autonomous vehicle, an image that captures a given traffic light, and controlling the autonomous vehicle based on a current state of the given traffic light included in the image.

In even further versions of those implementations, the method may further include determining whether a given configuration assigned to the given the given traffic light corresponds to the configuration or the additional configuration. The method may further include, in response to determining that the given configuration assigned to the given traffic light corresponds to the configuration, selecting the machine learning classifier to process the received image that captures the given traffic light, generate, based on processing the received image using the machine learning classifier, predicted output associated with multiple candidate states of the given traffic light, selecting, based on the predicted output, one of the candidate states as a current state of the given traffic light, and controlling the autonomous vehicle based on a current state of the given traffic light included in the image.

In alternative further versions of those implementations, the method may further include determining whether a given configuration assigned to the given the given traffic light corresponds to the configuration or the additional configuration. The method may further include, in response to determining that the given configuration assigned to the given traffic light corresponds to the additional configuration, selecting the additional machine learning classifier to process the received image that captures the given traffic light, generate, based on processing the received image using the additional machine learning classifier, predicted output associated with multiple candidate states of the given traffic light, and selecting, based on the predicted output, one of the candidate states as the current state of the given traffic light.

In other alternative further versions of those implementations, the method may further include identifying a given configuration assigned to the given the given traffic light, generate, based on processing the received image using the machine learning classifier along with a given configuration indication that corresponds to the given configuration, predicted output associated with multiple candidate states of the given traffic light, and selecting, based on the predicted output, one of the candidate states as the current state of the given traffic light.

In some implementations, the configuration indication that corresponds to the configuration that is assigned to the traffic light is may include a semantic indicator associated with the configuration that is assigned to the traffic light.

In some implementations, the machine learning classifier may be a convolutional neural network.

In some implementations, the candidate states of the traffic light may include one or more of a first state indicative of a red state of the traffic light, a second state indicative of a yellow state of the traffic light, a third state indicative of a green state of the traffic light, a fourth state indicative of an off state of the traffic light, or a fifth state indicative of a not visible state of the traffic light.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
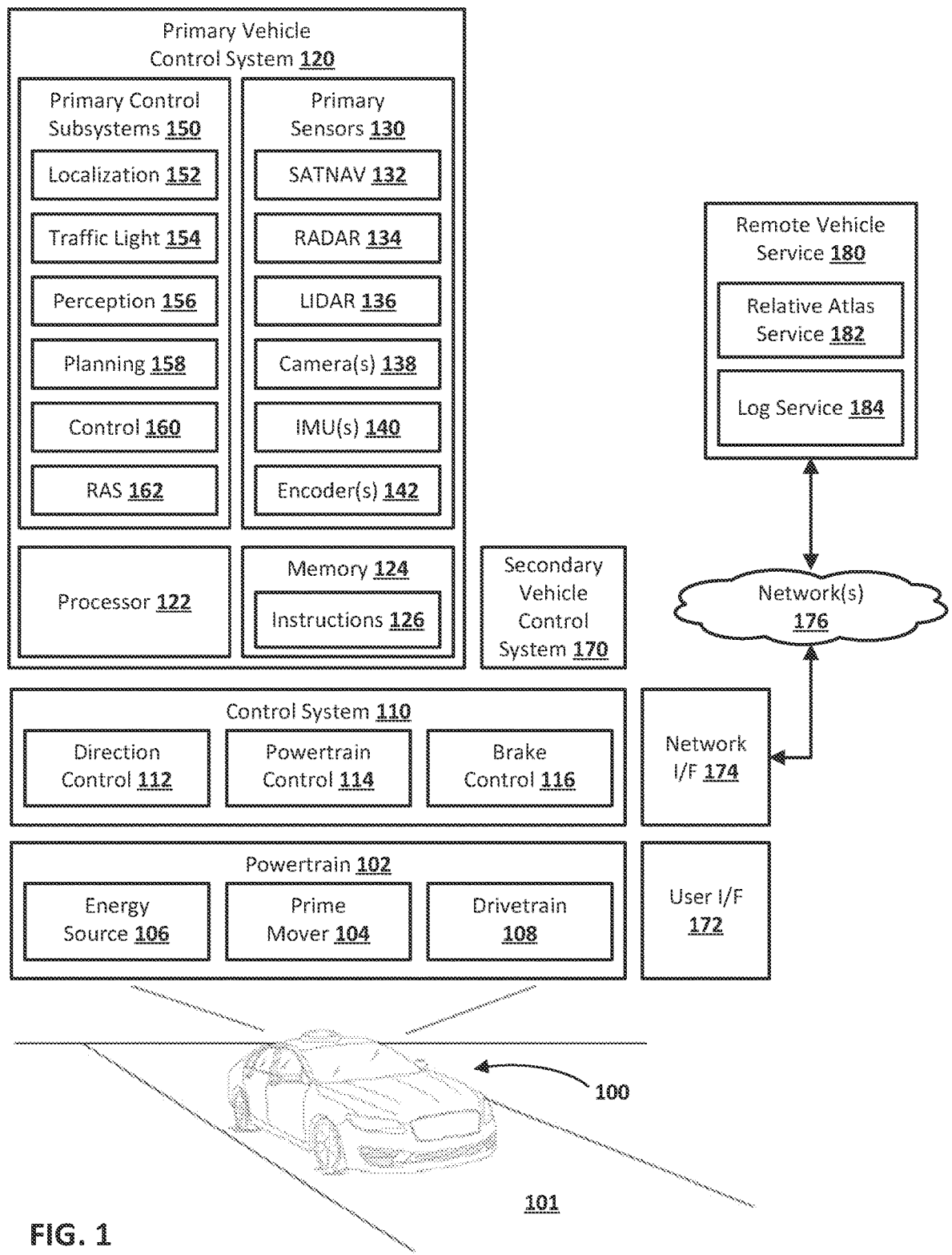
FIG. 1 illustrates an example hardware and software environment for an autonomous vehicle, in accordance with various implementations.

In various implementations, determining a current state of at least one traffic light for use in controlling an autonomous vehicle includes processing an image, that captures a region of an environment of the autonomous vehicle that is predicted to include the at least one traffic light, using machine learning classifier(s) to generate predicted output(s), and processing the predicted output(s) to determine the current state of the at least one traffic light. In some of those implementations, the predicted output(s) can be further generated based on configuration(s) assigned to the at least one traffic light.

An intersection of interest can be an intersection that includes one or more traffic lights, and that the autonomous vehicle is currently navigating or that the autonomous vehicle will navigate through in the near future. The intersection of interest associated with the at least one traffic light can be identified from a stored mapping of the environment of the autonomous vehicle based on a pose instance of the autonomous vehicle, and can include location and/or orientation information of the autonomous vehicle with respect to the environment of the autonomous vehicle. Further, intersection data stored in association with the intersection of interest can be identified from the mapping, and can include at least pose(s) (position and/or orientation) traffic light(s) of the intersection of interest, configuration(s) assigned to the intersection of interest, and/or control set(s) associated with each of the traffic light(s) of the intersection of interest. Further, the region of the environment of the autonomous vehicle that is predicted to include the at least one traffic light captured in the image can be identified based on the pose(s) of the traffic light(s).

In various implementations, the machine learning classifier(s) include one or more convolutional neural networks (CNNs) (i.e., a neural network that includes one or more convolutional layers) trained to generated predicted output(s) that indicate a corresponding numerical measure for each of multiple candidate states of the at least one traffic light. The corresponding numerical measures are indicative of how likely the given traffic light is in a given one of the candidate states, and can include, for example, corresponding probabilities, corresponding log odd ratios, corresponding state scores, and/or any other numerical measure capable of encoding the candidate states of the given traffic light. Moreover, generating the predicted output(s) can be further based on the configuration(s) assigned to the at least one traffic light. The configuration(s) assigned to the at least one traffic light can include features of the traffic lights, and can be one of multiple disparate configurations in a taxonomy of configurations. The multiple disparate configurations in the taxonomy are mutually exclusive and are each visually differentiable from one another. Each configuration can include a unique combination of bulb(s), unique placement of bulb(s), unique bulb types, and/or unique orientation(s) of bulb(s)—relative to all other configurations.

In some versions of those implementations, generating the predicted output(s) further includes processing indications of the configuration(s) of the at least traffic light, along with the image(s) that capture the region(s) of the at least one traffic light, using one or more of the CNNs. Put another way, a given CNN can be used to generate predicted output(s) for multiple candidate states of the at least one traffic light, and can apply an indication of the orientation(s) and/or bulb pattern(s) of the at least one traffic light as input across the given CNN in generating the predicted output(s) for the multiple candidate states. In some additional and/or alternative versions of those implementations, generating the predicted output(s) includes selecting a given one of the CNNs based on the configuration(s) of the at least one traffic light, and processing the image using the given one or the CNNs. For example, a first one of the CNNs can be trained to process images of vertical traffic lights that include three bulbs, a second one of the CNNs can be trained to process images of vertical traffic lights that include four bulbs, a third one of the CNNs can be trained to process images of horizontal traffic lights that include three bulbs, and so on for the disparate configurations in the taxonomy. In these manners, the predicted output(s) generated using the machine learning classifier(s) can make more accurate predictions as to the current state of the at least one traffic light.

Prior to further discussion of these implementations, however, an example hardware and software environment within which the various techniques disclosed herein may be implemented will be discussed.

Turning to the drawings, wherein like numbers denote like parts throughout the several views, FIG. 1 illustrates an example autonomous vehicle 100 within which the various techniques disclosed herein may be implemented. Vehicle 100, for example, is shown driving on a road 101, and vehicle 100 may include powertrain 102 including prime mover 104 powered by energy source 106 and capable of providing power to drivetrain 108, as well as control system 110 including direction control 112, powertrain control 114 and brake control 116. Vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, prime mover 104 may include one or more electric motors and/or an internal combustion engine (among others), while energy source 106 may include a fuel system (e.g., providing gasoline, diesel, hydrogen, etc.), a battery system, solar panels or other renewable energy source, a fuel cell system, etc., and the drivetrain 108 may include wheels and/or tires along with a transmission and/or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used, e.g., in the case of electric/gas hybrid vehicles, and in some instances multiple electric motors (e.g., dedicated to individual wheels or axles) may be used as a prime mover. In the case of a hydrogen fuel cell implementation, the prime mover may include one or more electric motors and the energy source may include a fuel cell system powered by hydrogen fuel.

Direction control 112 may include one or more actuators and/or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over vehicle 100 (which may include various degrees of autonomy as well as selectively autonomous functionality) is primarily implemented in a primary vehicle control system 120, which may include one or more processors 122 and memory 124, with processors 122 configured to execute program code instructions 126 stored in memory 124.

Primary sensor system 130 may include various sensors suitable for collecting information from a vehicle's surrounding environment for use in controlling the operation of the vehicle. For example, satellite navigation (SATNAV) sensor 132, e.g., compatible with any of various satellite navigation systems such as GPS, GLONASS, Galileo, Compass, etc., may be used to determine the location of the vehicle on the Earth using satellite signals. Radio Detection And Ranging (RADAR) and Light Detection and Ranging (LIDAR) sensors 134 and 136, as well as a camera(s) 138 (which may include various types of vision components capable of capturing still and/or video imagery), may be used to sense stationary and moving objects within the immediate vicinity of a vehicle. Inertial measurement unit (IMU) 140 may include multiple gyroscopes and accelerometers capable of detection linear and rotational motion of a vehicle in three directions, while wheel encoder(s) 142 may be used to monitor the rotation of one or more wheels of vehicle 100.

In addition, Relative Atlas Subsystem (RAS) 162 may be provided in the illustrated implementations to describe the elements within an environment and the relationships therebetween. Further, RAS 162 may be accessed by each of the localization, traffic light, planning, and perception subsystems 152-158 to obtain information about the environment for use in performing their respective functions. Moreover, RAS 162 may interact with remote vehicle service 180, over network(s) 176 via network interface (network I/F) 174.

In addition, Relative Atlas Subsystem (RAS) 162 may be provided in the illustrated implementations to describe the elements within an environment and the relationships therebetween. Further, RAS 162 may be accessed by each of the localization, traffic light, planning, and perception subsystems 152-158 to obtain information about the environment for use in performing their respective functions. Moreover, RAS 162 may interact with remote vehicle service 184, over network(s) 176 via network interface (network I/F) 174.

It will be appreciated that the collection of components illustrated in FIG. 1 for primary vehicle control system 120 is merely exemplary in nature. Individual sensors may be omitted in some implementations, multiple sensors of the types illustrated in FIG. 1 may be used for redundancy and/or to cover different regions around a vehicle, and other types of sensors may be used. Likewise, different types and/or combinations of control subsystems may be used in other implementations. Further, while subsystems 152-162 are illustrated as being separate from processors 122 and memory 124, it will be appreciated that in some implementations, some or all of the functionality of subsystems 152-162 may be implemented with program code instructions 126 resident in memory 124 and executed by one or more of processors 122. Further, these subsystems 152-162 may in some instances be implemented using the same processors and/or memory, while in other instances may be implemented using different processors and/or memory. Subsystems 152-162 in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and/or other components. Further, the various components in primary vehicle control system 120 may be networked in various manners.

In some implementations, vehicle 100 may also include a secondary vehicle control system 170, which may be used as a redundant or backup control system for vehicle 100. In some implementations, secondary vehicle control system 170 may be capable of fully operating vehicle 100 in the event of an adverse event in primary vehicle control system 120, while in other implementations, secondary vehicle control system 170 may only have limited functionality, e.g., to perform a controlled stop of vehicle 100 in response to an adverse event detected in primary vehicle control system 120. In still other implementations, secondary vehicle control system 170 may be omitted.

In general, an innumerable number of different architectures, including various combinations of software, hardware, circuit logic, sensors, networks, etc. may be used to implement the various components illustrated in FIG. 1. Each of processors 122 may be implemented, for example, as central processing unit(s) (CPU(s)), graphics processing unit(s) (GPU(s)), tensor processing unit(s) (TPU(s)), and/or any combination thereof, and each portion of memory 124 may represent random access memory (RAM) devices comprising a main storage, as well as any supplemental levels of memory, e.g., cache memories, non-volatile or backup memories (e.g., programmable or flash memories), read-only memories, etc. In addition, each portion of memory 124 may be considered to include memory storage physically located elsewhere in vehicle 100, e.g., any cache memory in a processor, as well as any storage capacity used as a virtual memory, e.g., as stored on a mass storage device or on another computer or controller. One or more of processors 122 illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, vehicle 100 may include a user interface 172 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface, e.g., from a remote operator.

Moreover, vehicle 100 may include one or more network interfaces, e.g., network interface 174, suitable for communicating with network(s) 176 (e.g., a LAN, a WAN, a wireless network, Bluetooth, and/or the Internet, among others) to permit the communication of information with other vehicles, computers, and/or electronic devices, including, for example, a central service, such as a cloud service, from which vehicle 100 receives environmental and other data for use in autonomous control thereof. In the illustrated implementations, for example, vehicle 100 may be in communication with a cloud-based remote vehicle service 180 including, at least for the purposes of implementing various functions described herein, a relative atlas service 182 and a log collection service 184. Relative atlas service 182 may be used, for example, to maintain a global repository describing one or more geographical regions of the world, as well as to deploy portions of the global repository to one or more autonomous vehicles, to update the global repository based upon information received from one or more autonomous vehicles, and to otherwise manage the global repository. Log service 184 may be used, for example, to collect and/or analyze observations made by one or more autonomous vehicles during operation, enabling updates to be made to the global repository, as well as for other purposes.

Each of processors 122 illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, programs, objects, modules, and/or other components may also execute on one or more processors in another computer coupled to vehicle 100 via network(s) 176, e.g., in a distributed, cloud-based, or client-server computing environment, whereby the processing required to implement the functions of a computer program may be allocated to multiple computers and/or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program codes described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2A:
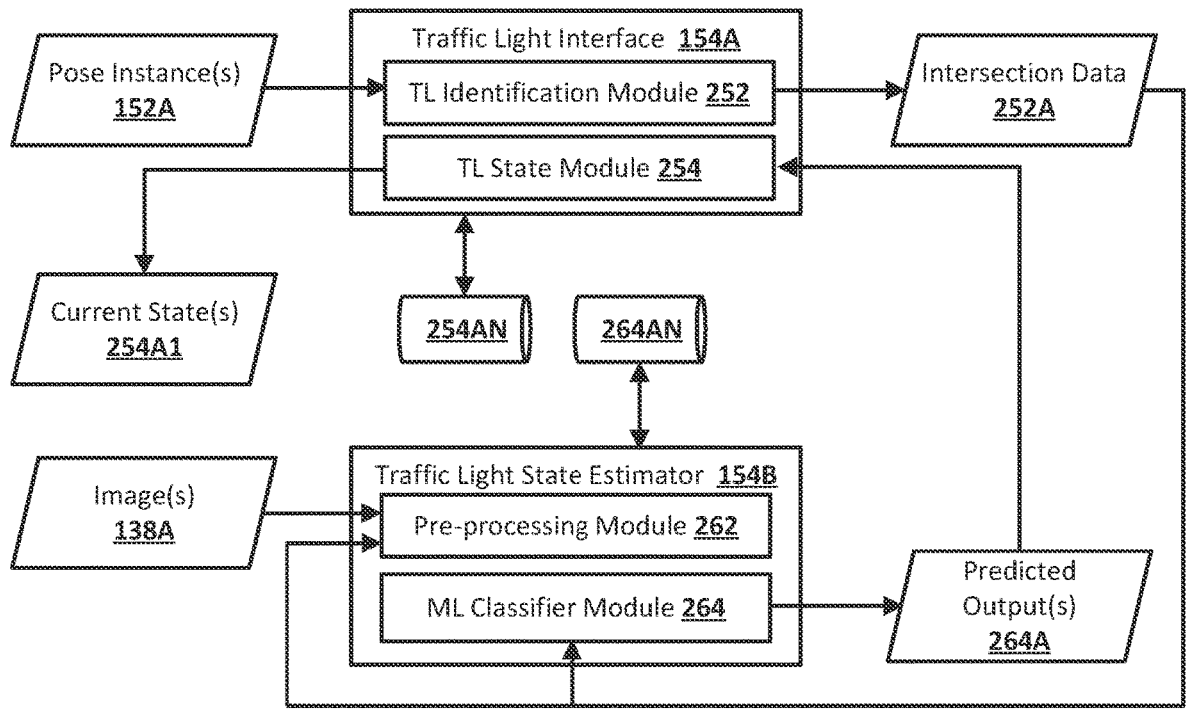
FIG. 2A and FIG. 2B are block diagrams illustrating example implementations of the traffic light subsystem referenced in FIG. 1, in accordance with various implementations.
Figure 2B:
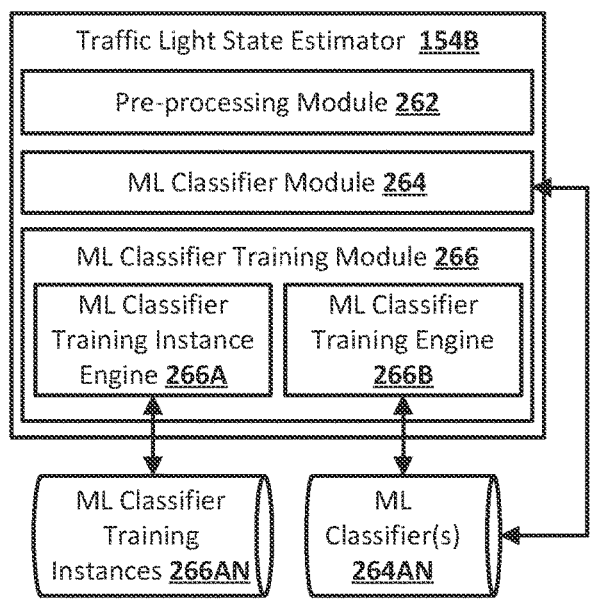

Turning to FIGS. 2A and 2B, block diagrams illustrating example implementations of traffic light subsystem 154 referenced in FIG. 1 are depicted. As shown in FIG. 2A, traffic light subsystem 154 can include traffic light interface 154A and traffic light state estimator 154B. Data generated by sensors of primary sensor system 130 and/or other subsystems of vehicle 100 can be received by traffic light interface 154A and/or traffic light state estimator 154B. The data can include, for example, pose instances generated by localization subsystem 152, vision data corresponding to image(s) 138A captured via vision components associated with camera(s) 138 of vehicle 100, intersection data representing previously mapped portions of an environment, and/or other data generated by other sensors or subsystems of vehicle 100. Traffic light interface 154A and/or traffic light state estimator 154B can generate output based on the received data, and can transmit the generated output therebetween and/or to various subsystems of vehicle (e.g., perception subsystem 156, planning subsystem 158, control subsystem 160, RAS subsystem, and/or other subsystems of vehicle 100).

The generated output can include, for example, intersection data associated with an intersection of interest for an autonomous vehicle, predicted output associated with candidate states of traffic light(s), a current state of the traffic light(s), control set(s) associated with the current state of the traffic light(s), a duration of time since a last transition of the traffic light(s), flashing pattern(s) of the traffic light(s), and/or any other output described herein that is generated by traffic light interface 154A and/or traffic light state estimator 154B. The state(s) of a traffic lights at any given time instance can include, for example, a red state, a red arrow state, a yellow state, a yellow arrow state, a green state, a green arrow state, an off state, a not visible state, and/or any other state(s) of traffic lights. Further, the candidate states of a traffic light can include one or more of the states, and the current state can be any given one of the candidate states.

Referring specifically to FIG. 2A, traffic light interface 154A may include traffic light (TL) identification module 252 and TL state module 254 as depicted in FIG. 2A. Traffic light interface 154A can identify an intersection of interest for vehicle 100 and intersection data 252A associated therewith using TL identification module 252. The intersection of interest can be an intersection that includes one or more traffic lights, and that vehicle 100 is currently navigating or that vehicle 100 will navigate through in the near future. TL identification module 252 can receive pose instance(s) 152A generated by localization subsystem 152 of vehicle 100. The pose instance(s) 152A can each include, for example, location and/or orientation information of vehicle 100 at any given and with respect to an environment of vehicle 100.

Moreover, TL identification module 252 can also receive at least a portion of an atlas associated with the received pose instance. The atlas can be a stored mapping of various geographical areas and features of the geographical areas. The features of the geographical areas can include, for example, landmarks and data associated therewith, roads and data associated therewith, intersections and data associated therewith, and/or any other features of the geographical area that can be stored in the mapping. The received portion of the atlas can include an environment of vehicle 100 as indicated by the pose instance(s) 152A of vehicle 100. For example, TL identification module 252 can determine an environment of vehicle 100 is included in the portion of the atlas based on the location information included in the pose instance(s) 152A, and can determine a direction of travel of vehicle 100 in the environment based on the orientation information included in the pose instance(s) 152, or indicated by heading determined based on a sequence of pose instances.

Further, TL identification module 252 can identify intersection data 252A associated with an intersection of interest. The intersection of interest can be an intersection that includes one or more traffic lights, and that vehicle 100 is currently navigating or that vehicle 100 will navigate through in the near future. The intersection data 252A can be stored in association with the intersection of interest in the atlas. Further, the intersection data 252A can include, for example, a type of intersection, height and width information associated with the intersection of interest, a number of traffic lights included in the intersection, a stored pose of the traffic light(s) in the mapping (also referred to as location(s) assigned to one or more of the traffic lights (or), configurations assigned to one or more of the traffic lights, control set(s) associated with one or more of the traffic lights, temporal constraint(s) associated with one or more of the traffic lights, and/or other data related to the intersection of interest. The identified intersection data 252A associated with the intersection of interest can be transmitted to traffic light state estimator 154B.

The type of intersection can include an indication that the intersection of interest is a four-way intersection, Y-intersection, T-intersection, a traffic circle, a turning lane, and/or any other type of intersection that includes traffic light(s). The number of traffic lights can include a total number of traffic lights at the intersection of interest (i.e., one or more traffic lights that control all directions of traffic), or a subset of the total number of traffic lights that include only the traffic lights relevant to controlling vehicle 100 (i.e., one or more traffic lights that influence control of vehicle 100 in the direction of travel of vehicle 100).

The pose(s) of the traffic light(s) can include, for example, height and width information of the traffic lights (optionally relative to the height and width information of the intersection of interest) with respect to the environment of vehicle 100, an area (e.g., 2-D, 2.5D, or 3D area) within the environment of vehicle 100 assigned to each of the traffic lights, and/or other information for defining the location(s) of the traffic light(s). In other words, a pose (position and/or orientation) of the traffic light(s) can be stored in the mapping. Further, the location(s) of the traffic light(s) can be initially defined in the mapping based on sensor data generated in previously mapping the intersection of interest (e.g., vision data from camera(s) and/or other vision components, LIDAR data from a LIDAR sensor, and/or other sensor data generated by other sensors of vehicle 100), and/or heuristically defined in the mapping.

Moreover, the pose(s) included in the intersection data 252A enable the TL identification module 252 to identify region(s), in image(s) that capture the traffic light(s) in the environment of vehicle 100, and that are predicted to include a corresponding traffic light based on the pose instance(s) 152A. For a given traffic light this can include the TL identification module 252 identifying a stored pose of the traffic light in the atlas, and determining, based on the stored pose and a pose instance of the vehicle 100 that temporally corresponds to the image, which region of the image captures the stored pose (e.g., by transforming the stored pose in view of the current pose instance of the vehicle 100). For example, the height and width information of the traffic light(s) (and optionally with respect to the height and width information of the intersection of interest) can include a height and width of each of the traffic lights and/or a midpoint of the height and a midpoint of the width of each of the traffic lights. In this example, TL identification module 252 can use one or more geometric transformation techniques to identify the region(s) associated with the height and width information of each of the traffic lights captured in the image. As another example, the area within the environment of vehicle 100 assigned to each of the traffic lights can include a centroid of the area, a bounding box associated with the area, and/or other techniques for defining areas in space. In this example, TL identification module 252 can use one or more geometric transformation techniques to identify the region(s) associated with the area of each of the traffic light(s) captured in the image.

The configuration(s) assigned to the one or more traffic lights can indicate features of the traffic lights, and can be one of multiple disparate configurations in a taxonomy of configurations. The multiple disparate configurations in the taxonomy are mutually exclusive and are each visually differentiable from one another. Each configuration can include a unique combination of bulb(s), unique placement of bulb(s), unique bulb types, and/or unique orientation(s) of bulb(s)—relative to all other configurations. The bulb patterns can include any number of bulbs in any combination of patterns for a traffic light. The types of the traffic light can include a standalone traffic light, a traffic light connected to pole/post, and so on, and the orientation of the traffic light can include vertical, horizontal, angled, and/or other orientations. For example, a first configuration in the taxonomy can include vertical traffic lights having three bulbs, a second configuration in the taxonomy can include vertical lights having five bulbs, a fourth configuration in the taxonomy can include vertical traffic lights having three bulbs, and so on for any combination of orientations and/or bulb patterns of traffic lights.

The control sets associated with the one or more traffic lights can be associated with one or more bulb patterns for each of the traffic lights that influence one or more actions of the autonomous vehicle at the intersection of interest. Put another way, the control sets associated with the one or more traffic lights can include semantic representations of one or more bulb patterns of a given traffic light that govern the one or more actions that the autonomous vehicle can perform at the intersection of interest. The actions of the autonomous vehicle can include, for example, a left turn action, a U-turn action, a right turn action, a pass through action, a veer left action, a veer right action, and/or any other action that can be taken by the autonomous vehicle at an intersection based on a state of the traffic light(s). Further, the control sets can also include an identifier associated with a given action of the autonomous vehicle. For example, control sets associated with a left turn action or U-turn action may be identified as left control sets, control sets associated with a pass through action as main control sets, control sets associated with a right turn action as right control sets, and so on.

In some implementations, a single control set can be associated with a given traffic light. For example, if a given traffic light controls a left turn action and the given traffic light includes a red arrow, yellow arrow, and green arrow, then a left control set associated with the given traffic light may include a representation thereof, such as [red arrow, yellow arrow, green arrow], or more generally [red, yellow, green] since the bulbs are associated with the left control set, or simply [1,1,1] to indicate a number of bulbs for the given traffic light. In some implementations, multiple control sets can be associated with a given traffic light. For example, assume a given traffic light is a vertical traffic light having a bulb pattern of [red, yellow, yellow arrow, green, green arrow], that influence whether the autonomous vehicle can perform a pass through action or a right turn action. In this example, the given traffic light can be associated with a main control set of, for example, [red, yellow, green], and a right control set of, for example, [red, yellow arrow, green arrow].

The temporal constraints associated with one or more of the traffic lights can include an indication of whether a given traffic light is associated with one or more temporal constraints, and, if so, an indication of the one or more temporal constraints. The temporal constraints can include, for example, whether certain actions at the intersection of interest are prohibited during given period(s) of time, whether certain traffic lights at the intersection of interest are inactive during given period(s) of time, and so on. For example, if a left turn action is prohibited at a given traffic light of the intersection of interest between the hours of 4:00 PM and 6:00 PM, then the temporal constraints can include an indication that the left turn action cannot be taken at the intersection of interest between 4:00 PM and 6:00 PM. As noted above, the identified intersection data 252A associated with the intersection of interest can be transmitted to traffic light state estimator 154B.

In some implementations, traffic light state estimator 154B can include pre-processing module 262 and machine learning (ML) classifier module 264 as depicted in FIGS. 2A and 2B. In some versions of those implementations, traffic light state estimator 154B can process the intersection data 252A received from traffic light interface 154A along with vision data corresponding to image(s) 138A received from one or more vision components of vehicle 100 (e.g., via camera(s) 138 of primary sensor system 130). The vision data corresponding to the image(s) 138A may be part of a stream of vision data corresponding to images that capture one or more traffic lights of the intersection of interest. Further the vision data corresponding to the image(s) 138A can include, for example, raw image data corresponding to RGB images, YUV images, black and white images, greyscale images, and/or other types of images. Further, the vision data corresponding to the image(s) 138A can optionally include a depth component.

Pre-processing module 262 can identify region(s), of the image(s) 138A of the intersection of interest, that are predicted to include one or more of the traffic lights of the intersection. Pre-processing module 262 can identify the region(s) based on the intersection data 252A, and, more particularly, based on the locations (or stored poses) of the one or more traffic lights included in the intersection data 252A. For example, in implementations where the locations of the one or more traffic lights include areas of the environment assigned to the traffic lights as noted above, pre-processing module 262 can identify those areas in the image(s) 138A as the region(s) that are predicted to include one or more of the traffic lights using one or more geometric transformation techniques. As another example, in implementations where the locations of the one or more traffic lights include the height and width information (and optionally relative to the height and width of the intersection) as noted above, pre-processing module 262 can identify an area of the image(s) 138A based on the height and width of one or more of the traffic lights as the region(s) that are predicted to include one or more of the traffic lights using one or more geometric transformation techniques.

In some further versions of those implementations, pre-processing module 262 can crop the image(s) 138A of the intersection of interest, based on the identified region(s) that are predicted to include one or more of the traffic lights. The cropped image(s) from the image(s) 138A can each include one or more of the traffic light(s). Notably, a given one of the image(s) 138A may include multiple traffic lights of the intersection of interest, and pre-processing module 262 may crop the given one of the image(s) 138A into multiple cropped images, such that each of the cropped images includes a given one of the one or more traffic lights of the intersection of interest. Moreover, each of the cropped images may be annotated with an indication of a corresponding one of the locations of the one or more traffic lights. For example, if a given one of the image(s) 138A includes four traffic lights, then pre-processing module 262 may crop the given one of the image(s) into four cropped images that each include a corresponding one of the four traffic lights. Further, each of the four cropped images can be annotated with an indication of the location of the traffic light.

The cropped image(s) of one or more of the traffic lights can be cropped based on a predetermined size (e.g., 64×64 pixels, 96×96 pixels, 128×128 pixels, 64×128 pixels, and/or other square or non-square sizes). In implementations where the cropped image(s) are cropped based on the predetermined size, pre-processing module 262 can identify a center pixel from areas of the environment of vehicle 100 and/or height and width information stored in association with one or more of the traffic lights, and can use the center pixel as a center for cropping the image(s) to the predetermined size. Further, this can be repeated for any additional traffic light of the intersection of interest that is captured in the given image of the image(s) 138A. For example, pre-processing module 262 can receive a given image of the image(s) 138A, identify a first area of the environment assigned to a first traffic light from the received intersection data 252A, and crop a 96×96 image, from the given image of the image(s) 138A, that is centered around a center pixel corresponding to a centroid of the area. As another example, pre-processing module 262 can receive a given image of the image(s) 138A, identify first height and width information associated with a first traffic light from the received intersection data 252A, and crop a 64×128 image, from the given image of the image(s) 138A, that is centered around a center of an area of the first traffic light determined based on the first height and width information.

Additionally and/or alternatively, the cropped image(s) of one or more of the traffic lights can be cropped based on the region(s) that are predicted to include one or more of the traffic lights. In implementations where the cropped image(s) are cropped based on the region(s) that are predicted to include one or more of the traffic lights, pre-processing module 262 may optionally include a buffer region surrounding the region(s) that are predicted to include one or more of the traffic lights. Further, this can be repeated for any additional traffic light of the intersection of interest that is captured in the given image of the image(s) 138A. For example, pre-processing module 262 can receive a given image of the image(s) 138A, identify a first area assigned to a first traffic light from the received intersection data 252A, and crop a region of the given image of the image(s) that includes the first area (and optionally a buffer region of pixels surrounding the first area). As another example, pre-processing module 262 can receive a given image of the image(s) 138A, identify first height and width information associated with a first traffic light from the received intersection data 252A, and crop a region of the given one of the image(s) 138A that includes an area of the first traffic light determined based on the first height and width information (and optionally a buffer region of pixels surrounding the area identified based on the height and width information).

In some further versions of those implementations, pre-processing module 262 can additionally and/or alternatively transform the image(s) 138A and/or the cropped image(s) (referred to collectively hereinafter as "the image(s) 138A"). Pre-processing module 262 may use one or more image transformation techniques, such as affine transformation techniques (e.g., rotating, scaling, translating, shearing, etc.), interpolation techniques (e.g., bilinear interpolation, nearest-neighbor interpolation, bicubic interpolation, etc.), and/or other image transformation techniques. By transforming the image(s) 138A, pre-processing module 262 can normalize each of the image(s) 138A for subsequent processing. For example, assume that subsequent processing of the image(s) 138A requires each of the image(s) 138A to be a certain size/dimension (e.g., 64×64, 96×96, 64×128, 128×64, and/or other sizes/dimensions that are square or non-square), and further assume a given one of the image(s) 138A is not the correct size/dimensions. In this example, the given one of the image(s) 138A can be scaled to the correct size/dimensions for the subsequent processing. Moreover, by using these image transformation techniques, a given traffic light captured in the image(s) 138A appears as if the given traffic light is being viewed from the front and minimal background imagery is included in the image processed by the ML classifier(s) 264AN.

Further, pre-processing module 252 may use one or more of the aforementioned image transformation techniques to modify the image(s) 138A to make them appear as front views of the traffic light(s). For example, if a given image of the image(s) 138A is captured from an angle that makes a given traffic light appear as if it is rotated about a vertical axis by 15 degrees, thereby causing portions of bulbs of the first traffic light to appear occluded in the given image, then pre-processing module 262 may use one or more interpolation techniques to determine values for pixels that are occluded based on values for pixels that are not occluded and interpolate those values into the given image. As another example, if a given image of the image(s) is captured from an angle that makes the first traffic light appear as if it is tilted about a vertical axis by 15 degrees, then pre-processing module 262 may use one or more affine transformation techniques to rotate the first traffic light to appear vertical in the given image. Accordingly, pre-processing module 262 can ensure that each of the image(s) 138A are normalized prior to further processing of the image(s) 138A. In various implementations, ML classifier(s) 264AN can be trained primarily (e.g., 75% or more of training instances), or even exclusively, on such front and/or normalized views of the traffic light(s) generated by pre-processing module 262. Further, by using the aforementioned image transformation techniques to make the image(s) 138A appear as front views of the traffic light(s), the predicted output(s) 264A generated by ML classifier(s) 264AN can be more accurate than if ML classifier(s) 264AN are trained on images that are not transformed and/or normalized.

Moreover, ML classifier module 264 can generate, based on processing the image(s) 138A, predicted output(s) 264A associated with one or more candidate states of the traffic lights using ML classifier module 264. ML classifier module 264 can generate the predicted output(s) 264A based on processing the image(s) 138A using ML classifier(s) 264AN that are trained to generate the predicted output(s) 264A. In some additional and/or alternative implementations, generating the predicted output(s) 264A is further based on processing the configuration(s) of one or more of the traffic lights included in the received intersection data 252A along with the image(s) 138A using ML classifier(s) 264AN that are trained to generate the predicted output(s) 264A.

Referring specifically to FIG. 2B, ML classifier(s) 264AN can be trained using ML classifier training module 266. ML classifier training module 266 can include ML classifier training instance engine 266A and ML classifier training engine 266B as depicted in FIG. 2B. ML classifier training instance engine 266A is principally responsible for generating training instances, including training instance input and corresponding training instance output, and storing the training instances in ML classifier training instances database 266AN. ML classifier training engine 266B is principally responsible for training the ML classifier(s) 264AN using the training instances stored in ML classifier training instances database 266AN.

Each training instance input can include a previously captured image of a given traffic light, and can optionally include a configuration assigned to the given traffic light (or, more generally, an indication of the configuration assigned to the traffic light). Further, each corresponding training instance output can include ground truth output corresponding to a state of the given traffic light captured in the image. For example, a first training instance can include first training instance input that includes an image of a first traffic light, and, assuming the state of the first traffic light in the image is the yellow state, corresponding first training instance output that include ground truth output corresponding to the yellow state of the first traffic light. In this example, the first training instance input can further include an indication of a configuration assigned to the first traffic light indicating that, for example, the first traffic light is a horizontal traffic light having a bulb pattern of [red, yellow, green]. As a further example, a second training instance can include second training instance input that includes an image of a second traffic light, and, assuming the state of the second traffic light in the image is a green state, corresponding second training instance output that includes ground truth output corresponding to the green state of the second traffic light. In this example, the second training instance input can further include an indication of a configuration assigned to the second traffic light indicating that, for example, the second traffic light is a vertical traffic light having a bulb pattern of [red, yellow arrow, yellow, green arrow, green]. In these examples, the indication of the configuration can be, for example, a semantic indicator assigned to one or more of the configurations. For instance, the configuration assigned to the first traffic light can have a semantic indicator of "1", the configuration assigned to the second traffic light can have a semantic indicator of "2", and so on for a plurality of disparate configurations in the taxonomy. In other instances, all traffic lights that have three bulbs (regardless of orientation) can have the same indicator (e.g., semantic indicator of "1"), all traffic lights that have four bulbs (regardless of orientation) can have the same indicator (e.g., semantic indicator of "2"), and all traffic lights that have five bulbs (regardless of orientation) can have the same indicator (e.g., semantic indicator of "3"), and so on.

In some implementations, the previously captured image of the given traffic light for one or more of the training instances can be manually labeled with the state of the given traffic light corresponding to ground truth output. For instance, a human reviewer may view a plurality of images of traffic lights, and label the state of each of the traffic lights in a corresponding one of the plurality of images. For example, a first image that includes a first traffic light in a yellow arrow state can be labeled with ground truth output corresponding to the yellow arrow state, a second image that includes a second traffic light in a green state can be labeled with ground truth output corresponding to the green state, and so on. In some further versions of those implementations, the previously captured image of the given traffic light for one or more of the training instances can be manually assigned a configuration of the given traffic light, from a plurality of disparate configurations in a taxonomy. Continuing with the example, assuming the first traffic light is a horizontal traffic light having a bulb pattern of [red arrow, yellow arrow, green arrow], the first traffic light can also be assigned a configuration to that effect, and so on.

In various implementations, ML classifier training instance engine 266A can index the training instances stored in ML classifier training instances database 266AN based on various indexing criteria. The indexing criteria can include, for example, the state corresponding to ground truth output, the configuration assigned to the traffic light, and/or other indexing criteria. For example, ML classifier training instance engine 266A can index the training instances stored in ML classifier training instances database 266AN according to the training instances that have the red state corresponding to ground truth output, the training instances that have the green arrow state corresponding to ground truth output, and so on for the other states. As another example, ML classifier training instance engine 266A can index the training instances stored in ML classifier training instances database 266AN according to the training instances including images of traffic lights that are assigned a first configuration, assigned a second configuration, and so on.

By indexing the training instances stored in ML classifier training instances database 266AN, multiple ML classifier(s) 264AN may be trained for particular state(s) and/or configuration(s) of traffic lights. For example, a first one of ML classifier(s) 264AN can be trained to generate first predicted output of the predicted output(s) 264A associated with a first state of the states using training instances that include images of traffic lights labeled with ground truth output corresponding to the first state, a second one of ML classifier(s) 264AN can be trained to generate second predicted output of the predicted output(s) 264A associated with a second state of the states using training instances that include images of traffic lights labeled with ground truth output corresponding to the second state, and so on for each of the states. As another example, a first one of ML classifier(s) 264AN can be trained to generate predicted output(s) 264A associated with multiple candidate states using training instances that include images of traffic lights assigned to a first configuration, a second one of ML classifier(s) 264AN can be trained to generate predicted output(s) 264A associated with multiple candidate states using training instances that include images of traffic lights assigned to a second configuration, and so on for each of the disparate configurations in the taxonomy. As yet another example, a first one of ML classifier(s) 264AN can be trained to generate predicted output(s) 264A associated with multiple candidate states using training instances that include images of traffic lights assigned to a first configuration and a second configuration, a second one of ML classifier(s) 264AN can be trained to generate predicted output(s) 264A associated with multiple candidate states using training instances that include images of traffic lights assigned to a third configuration and a fourth configuration, and so on for multiple disparate configurations in the taxonomy. In some of those example, an indication of the configuration (e.g., a semantic indicator) can also be applied as input across the corresponding one of ML classifier(s) 264AN.

ML classifier(s) 264AN can be one or more machine learning models trained to generate corresponding numerical measures for one or more candidate states of a given traffic light as the predicted output(s) 264A. In some implementations, the machine learning models can include, for example, a feed forward neural network model having a plurality of convolution layers (i.e., a convolutional neural network (CNN)), a graph neural network, and/or any other machine learning model capable of processing images. The predicted output(s) 264A generated by ML classifier module 264 using ML classifier(s) 264AN may be a function of the training instances used in training ML classifier(s) 264AN as noted above. Moreover, predicted outputs generated during training of ML classifier(s) 264AN may be stored in one or more databases along with ground truth output corresponding to a state of a given traffic light for which the predicted outputs are generated. These predicted outputs may subsequently be used in training additional model(s) as described in more detail below (e.g., with respect to traffic light (TL) model(s) 254AN).

The one or more machine learning models include at least an input layer, other layers, and an output layer. In some implementations, a size/dimension of the input layer may depend on a size/dimension of vision data corresponding to an image to be processed by ML classifier(s) 264AN. For example, if a given one of ML classifier(s) 264AN is trained using vision data corresponding to 64×64 images, then the size/dimension of the input later may be based on vision data that corresponds to 64×64 images. In other implementations, the ML classifier(s) 264AN may be robust enough to handle vision data of varying sizes/dimensions. In some implementations, a size/dimension of the output layer may depend on output a given one of the ML classifier(s) 264AN is trained to predict. For example, if a first one of the ML classifier(s) 264AN trained to predict a corresponding numerical measure associated with multiple candidate states for a given traffic light, then the size/dimension of the output layer will be different than a second one of the ML classifier(s) 264AN trained to predict a single numerical measure associated with a given one of the multiple candidate states for the given traffic light.

In some implementations, ML classifier(s) 264AN include one or more CNNs. In addition to convolution layer(s), a CNN can optionally include other layer(s) such as max pooling layer(s), softmax layer(s), and/or other fully connected layers that precede the output layer. Further, an indication of the configuration can be applied as input across the CNN in one or more downstream layers after the convolution layer(s) (e.g., as a side input). In some versions of those implementations, a given CNN may be trained to generate a corresponding numerical measure associated with multiple candidate states of a given traffic light based on a plurality of the training instances stored in ML classifier training instances database 266AN. The corresponding numerical measure associated with the multiple candidate states can be represented as, for example, a feature vector including the corresponding numerical measure for each of the candidate states (e.g., a probability corresponding to states of [red, yellow, green, off, not visible]). For example, assume first training instance input includes a first image of a first traffic light in a red state and also includes an indication of a first configuration assigned to the first traffic light, and assume corresponding first training instance output is ground truth output corresponding to the red state of the first traffic light (e.g., [1, 0, 0, 0, 0] where the "1" indicates the red state of the first traffic light). Further assume ML classifier training engine 266B causes the CNN to process first vision data associated with the first image to generate corresponding numerical measures of, for example, [0.3, 0.2, 0.2, 0.2, 0.1] corresponding to states of [red, yellow, green, off, not visible]. In this example, ML classifier training engine 266B can compare the corresponding numerical measures of [0.3, 0.2, 0.2, 0.2, 0.1] to the ground truth output corresponding to the red state of the first traffic light of [1, 0, 0, 0, 0]. Further, ML classifier training engine 266B can generate an error based on comparing the corresponding numerical measures to the ground truth output, and can cause the generated error to be backpropagated across the CNN, thereby updating the CNN.

In some other versions of those implementations, CNNs may be trained to generate a corresponding numerical measure associated with a given candidate state of a given traffic light based on a plurality of the training instances stored in ML classifier training instances database 266AN. The corresponding numerical measure associated with the given candidate states can be represented as, for example, a numerical measure for the given candidate state. Put another way, a first CNN can be trained to generate a first numerical measure that a given traffic light is in a first state, a second CNN can be trained to generate a second numerical measure that the given traffic light is in a second state, and so on for each of the candidate states. For example, assume first training instance input includes a first image of a first traffic light in a red state and also includes an indication of a first configuration assigned to the first traffic light, and assume corresponding first training instance output is ground truth output corresponding to the red state of the first traffic light (e.g., [1] for the first CNN trained to generate the predicted output associated with the red state of the first traffic light to indicate the red state, and [0] for the other CNNs). Further assume ML classifier training engine 266B causes the CNN to process first vision data associated with the first image to generate a first probability of, for example, [0.3] as the numerical measure corresponding to the red state, causes the second CNN to process first vision data associated with the first image to generate a second probability of, for example, [0.2] as the numerical measure corresponding to the yellow state, and so on for each of the candidate states. In this example, ML classifier training engine 266B can compare the corresponding numerical measures generated by each of the CNNs to the corresponding ground truth output. Further, ML classifier training engine 266B can generate a corresponding error based on comparing the corresponding numerical measures to the ground truth output for each of the CNNs, and can cause the generated corresponding error to be backpropagated across each of the CNNs, respectively, to update weight(s) of convolutional layer(s) and/or other layer(s) of the CNNs.

Referring back to FIG. 2A, traffic light state estimator 154B can transmit the predicted output(s) 264A, generated based on processing the image(s) 138A and/or the intersection data 252A using ML classifier(s) 264AN, to traffic light interface 154A. The traffic light interface 154A can determine, based on the predicted output(s) 264A, current state(s) 254A1 of one or more of the traffic lights of the intersection of interest using TL state module 254. More particularly, TL state module 254 can process the predicted output(s) 264A using TL model(s) 254AN to determine the current state(s) 254A1 of the given traffic light.

As noted above, TL model(s) 254AN can be trained based on predicted outputs generated during training of ML classifier(s) 264AN. Each training instance input can include a given predicted output of the predicted outputs, and each corresponding training instance output can include the ground truth output corresponding to a state of the given traffic light captured in the corresponding one of the image(s) 138A. TL model(s) 254AN may be dependent on the predicted output(s) 264A that ML classifier(s) 264AN are trained to generate. For example, in implementations where ML classifier(s) 264AN are trained to generate a corresponding numerical measure for one or multiple candidate states (using either one or multiple CNNs as ML classifier(s) 264AN as discussed above), TL model(s) 254AN can be, for example, a multi-class classifier having one or more learned functions. The multi-class classifier can be, for example, k-nearest neighbors (kNN) classifier, a naïve Bayes classifier, a support vector machine (SVM), and/or any other multi-class classifier. The output generated across the multi-class classifier can be the current state(s) 254A1 of the traffic light(s).

Referring back to FIG. 2A, in some implementations, TL state module 254 can transmit the current state(s) 254A1 to various other subsystem(s) of vehicle 100. For example, TL state module 254 can transmit the current state(s) 254A1 to perception subsystem 156, planning subsystem 158, control subsystem 160, and/or other subsystems of vehicle 100 for use in controlling vehicle 100.

In some additional and/or alternative implementations, TL state module 254 can determine a control set associated with the current state, and transmit the determined control set to the other subsystem(s) along with the current state(s) 254A1. The control set(s) associated with each of the traffic light(s) of the intersection of interest can be included in the intersection data 252A as discussed above. For example, if TL state module 254A selects the green state as the current state for a given traffic light, then the system can determine whether the selected green state is associated with a left control set, a main control set, a right control set, and/or other control set(s). In this example, if the green state is associated with a left control set, then vehicle 100 can perform a left turn action, but that is not indicative as to whether vehicle 100 can perform a pass through action or right turn action. Thus, images of each traffic light of the intersection of interest can be processed in a similar manner described above to determine a state of the intersection (i.e., the current state(s) 254A1 for each control set associated with the traffic light(s) of the intersection of interest).

Although FIGS. 2A and 2B are described herein as including a distinct pre-processing module 262, it should be understood that pre-processing module 262 may be omitted and/or included as part of ML classifier module 264 in various implementations. In some versions of those implementations, traffic light state estimator 154B can process the image(s) 138A that are received at traffic light state estimator 154B without any pre-processing (i.e., without any image cropping and/or image transformation) by ML classifier module 264. In some other versions of those implementations, traffic light state estimator 154B can process the image(s) 138A that are received at traffic light state estimator 154B after pre-processing (i.e., after any image cropping and/or image transformation) by ML classifier module 264.

Moreover, although traffic light subsystem 154 of FIGS. 2A and 2B is depicted as having traffic light interface 154A using TL model(s) 254AN distinct from traffic light state estimator 154B using ML classifier(s) 264AN, it should be understood that is for the sake of example and not meant to be limiting. In some implementations, traffic light interface 154A may be implemented on first hardware (e.g., primary vehicle control system 120 or secondary vehicle control system 170) and traffic light state estimator 154B may be implemented on second hardware distinct from the first hardware (e.g., the other of primary vehicle control system 120 or secondary vehicle control system 170). In other implementations, traffic light interface 154A and traffic light state estimator 154B can be distinct, but implemented on the same hardware. In yet other implementations, traffic light interface 154A and traffic light state estimator 154B can be combined, such that TL model(s) 254AN and ML classifier(s) 264AN are a combined end-to-end machine learning model that processes the image(s) 138A to generate the current state(s) 254A1.

Figure 3:
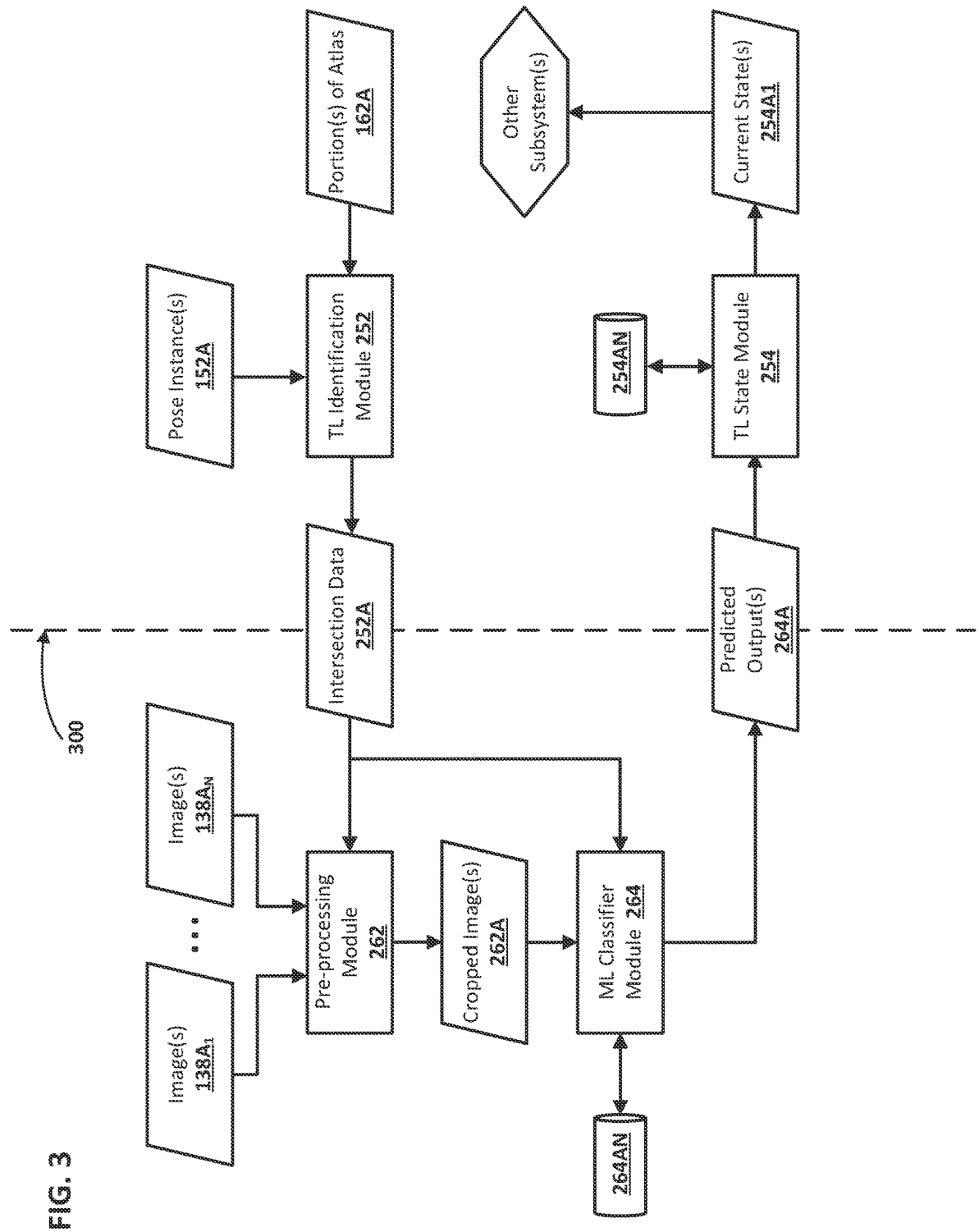
FIG. 3 is a process flow illustrating an example implementation of the traffic light subsystem referenced in FIG. 2A and FIG. 2B, in accordance with various implementations.

Turning now to FIG. 3, a process flow illustrating an example implementation of the traffic light subsystem 154 referenced in FIGS. 2A and 2B is depicted. The process flow of FIG. 3 can be implemented by primary vehicle control system 120 and/or secondary vehicle control system 170. In particular, modules on the right side of dashed line 300 can be implemented by traffic light interface 154A of FIGS. 2A, and modules on the left side of the dashed line 300 can be implemented by traffic light state estimator 154B of FIGS. 2A and 2B. Although the process flow of FIG. 3 is depicted as being implemented by traffic light interface 154A and a separate traffic light state estimator 154B, it should be understood that this is for the sake of example, and that traffic light interface 154A and separate traffic light state estimator 154B can be combined in various implementations.

TL identification module 252 can identify intersection data 252A based on pose instance(s) 152A of vehicle 100 and/or portion(s) of an atlas 162A that include a stored mapping of an environment of vehicle 100. More particularly, TL identification module 252 can identify an intersection of interest for vehicle 100 from the portion(s) of the atlas 162A based on the pose instance(s) 152A, and can identify the intersection data 252A stored in association with the intersection of interest from the portion(s) of the atlas 162A.

Further, the pose instances can be generated by localization subsystem 152 and can include, for example, location and/or orientation information of vehicle 100 that indicates vehicle 100 is at or near the intersection of interest. Moreover, the portion(s) of the atlas 162A that include the stored mapping of the environment of vehicle 100 can be identified based on the location and/or orientation information of vehicle 100 included in the pose instance(s) 152A. The portion(s) of the atlas 162A can include various features of the environment of vehicle 100. The features can include, for example, previously mapped landmarks, intersections, roads, and/or other features of the environment, and data associated with each of the features can be stored in the atlas. Thus, the portion(s) of the atlas 162A can include intersection data for a plurality of intersections in the environment of vehicle 100. TL identification module 252 can transmit the intersection data 252A to pre-processing module 262 and/or ML classifier module 264.

Image(s) of one or more of traffic lights of the intersection of interest can be captured by one or more vision components of vehicle 100 at or near the same time (e.g., within a threshold amount of time of one another, such as within 50 milliseconds of another, 75 milliseconds of one another, and/or other durations of time), and respective frame rates.

For example, a first vision component with a narrow field of view can capture image(s) 138A1 of the given traffic light, and an Nth vision component with a wide field of view can capture image(s) 138AN of the given traffic at or near the same time as the first vision component, where N is a positive integer greater than one. Each of the image(s) 138A1, 138AN can be annotated with a corresponding timestamp that can be used in subsequent processing of the image(s) 138A1, 138AN and/or vision data associated with the image(s) 138A1, 138AN. Each of the image(s) 138A1, 138AN can include one or more traffic lights of the intersection of interest, including the given traffic light.

In some implementations, pre-processing module 262 can identify, based on the locations (or poses) of one or more of the traffic lights of the intersection of interest included in the intersection data 252A, a region that is predicted to include a corresponding one of the one or more traffic lights. Further, pre-processing module 262 can crop, based on the region that is predicted to include the corresponding one of the one or more traffic lights, each of the image(s) 138A1, 138AN, thereby resulting in cropped image(s). For example, assume the intersection of interest includes three traffic lights, assume that a first vision component captures a first image of the three traffic lights at a first time, and assume that a second vision component captures a second image of the three traffic lights at or near the first time. In this example, there are two images of the intersection captured at or near the first time, and both of the images can be cropped based on the regions that are predicted to include a corresponding one of the three traffic lights, thereby resulting in six cropped images-two cropped images of each of the three traffic lights that temporally correspond to one another. In some versions of those implementations, pre-processing module 262 can transmit the cropped image(s) 262A to ML classifier module 264. In some versions of those implementations, each of the image(s) 138A1, 138AN can be received directly at ML classifier module 264.

ML classifier module 264 can generate predicted output(s) 264A for each of the one or more traffic lights of the intersection of interest based on processing the image(s) 138A1, 138AN of the one or more traffic lights of the intersection of interest and/or a corresponding one of the configurations of one or more of the traffic lights included in the intersection data 252A using ML classifier(s) 264AN. Further, ML classifier module 264 can process each of the image(s) 138A1, 138AN and/or the corresponding one of the configurations for the one or more traffic lights sequentially and/or in parallel. In some implementations, ML classifier(s) 264AN can include one or more machine learning models. In some versions of those implementations, ML classifier(s) 264AN can include one or more trained CNNs as discussed above with respect to FIGS. 2A and 2B. For instance, vision data corresponding to the image(s) 138A1, 138AN and/or the an indication of the configurations can be applied as input across one or more of the CNNs to generate a corresponding numerical measure for multiple candidate states of one or more of the traffic lights as the predicted output(s) 264A.

In some implementations, a given one of ML classifier(s) 264AN can be used to generate the predicted output(s) 264A for each of the image(s) 138A1, 138AN. In other implementations, multiple ML classifier(s) 264AN can be used to generate the predicted output(s) 264A for each of the image(s) 138A1, 138AN. In some versions of those implementations, a given one of ML classifier(s) 264AN can be selected by ML classifier module 264 to process a given one of the image(s) 138A1, 138AN based on the configuration assigned to a given traffic light captured in the given image. For example, a first one of ML classifier(s) 264AN can be used to generate the predicted output(s) 264A for images that include vertical traffic lights, a second one of ML classifier(s) 264AN can be used to generate the predicted output(s) 264A for images that include horizontal traffic lights, a third one of ML classifier(s) 264AN can be used to generate the predicted output(s) 264A for images that include traffic lights having five bulbs, and so on. The predicted output(s) 264A for the one or more traffic lights of the intersection of interest can be transmitted to TL state module 254.

TL state module 254 can determine current state(s) 254A1 of the one or more traffic lights of the intersection of interest using TL model(s) 254AN. TL model(s) 254AN may depend on the predicted output(s) 264A that ML classifier(s) 264AN is trained to generate. For example, in implementations where ML classifier(s) 264AN are trained to generate the corresponding numerical measure for one of or multiple of the candidate states, TL model(s) 254AN may include one or more learned functions specific to each of the multiple candidate states as discussed above with respect to FIGS. 2A and 2B. In some versions of those implementations, TL state module 254 can select the current state(s) 254A1 of a given traffic light based on output generated by applying the corresponding numerical measures for each of the multiple candidate states as input across the learned functions.

Figure 4:
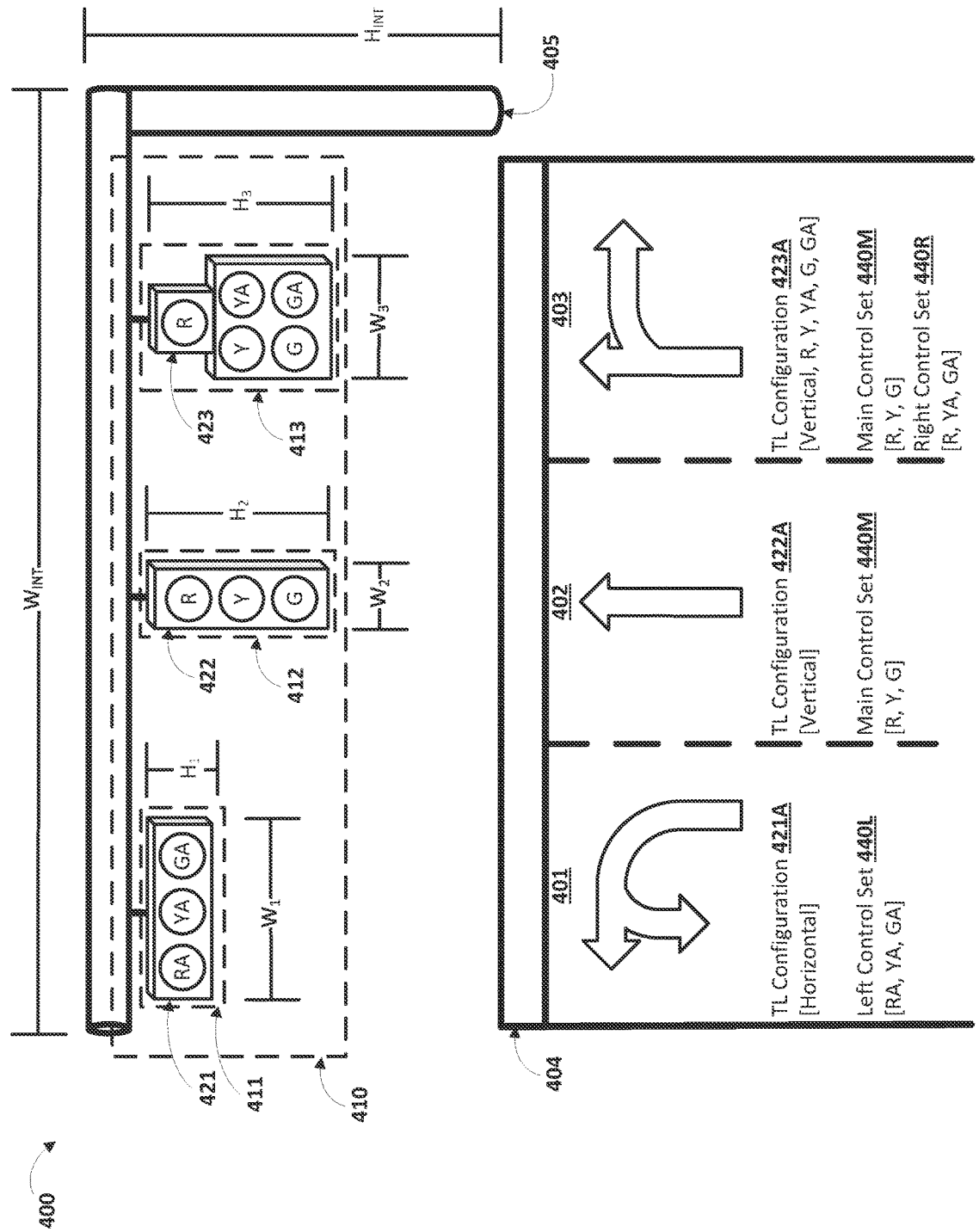
FIG. 4 is an example intersection of interest for an autonomous vehicle to navigate, in accordance with various implementations.

Turning now to FIG. 4, an example intersection of interest 400 for an autonomous vehicle (e.g., vehicle 100 of FIG. 1) to navigate is depicted. The intersection of interest 400 can be any intersection that includes one or more traffic lights, and that the autonomous vehicle is currently navigating or that the autonomous vehicle will navigate through in the near future. As depicted in FIG. 4, the intersection of interest 400 can include a first lane 401 associated with a left turn action and U-turn action that are influenced by a first traffic light 421, a second lane 402 associated with a pass through action that is influenced by a second traffic light 422, and a third lane 403 associated with the pass through action and a right turn action that are influenced by a third traffic light 423. Further, the intersection of interest 400 can include an entry point 404, and a traffic light pole 405. The entry point 404 can be a location where vehicles enter the intersection of interest to perform the aforementioned actions, and can vary from intersection-to-intersection and lane-to-lane for each intersection. The traffic light pole 405 can include one or more traffic lights of the intersection of interest 400 affixed thereto in various locations (e.g., hanging from a horizontal portion of the traffic light pole 405, connected to a vertical portion of the traffic light pole 405, and/or other locations). Although the intersection of interest 400 is depicted as a four-way intersection having three traffic lights, it should be understood that is for the sake of example and is not meant to be limiting. It should be understood that the intersection of interest 400 can be any intersection that includes traffic light(s) that controls corresponding actions that can be taken by the autonomous.

The intersection of interest 400 can be identified based on one or more pose instances of the autonomous vehicle as discussed in greater detail herein (e.g., with respect to FIG. 2A). Moreover, intersection data stored in association with the intersection of interest 400 in a mapping of an environment of the autonomous vehicle can be identified responsive to identifying the intersection of interest 400. The intersection data can include, for example, an indication that the intersection of interest 400 is 4-way intersection having three traffic lights, height HINT and width information $W_{INT}$ associated with the intersection of interest, stored poses of the traffic lights (e.g., $H_1$ and $W_1$ and/or area 411 for first traffic light 421, $H_2$ and $W_2$ and/or area 412 for second traffic light 422, and/or $H_3$ and $W_3$ and/or area 413 for third traffic light 423), assigned configurations (e.g., TL configuration 421A assigned to the first traffic light 421, TL configuration 422A assigned to the second traffic light 422, and/or TL configuration 423A assigned to the third traffic light 423), control sets associated with one or more of the traffic lights (e.g., left control set 440L associated with the first traffic light 421, main control set 440M associated with both the second traffic light 422 and the third traffic light 423, and/or right control set 440R associated with the third traffic light 423), and/or other data related to the intersection of interest.

Further, one or more vision components of the autonomous vehicle can capture images of the intersection of interest 400. In some implementations, a field of view 410 of one or more of the vision components can be adjusted based on the pose instances of the autonomous vehicle, the locations of each of the traffic lights 421-423 included in the intersection data, the height $H_{INT}$ and width $W_{INT}$ of the intersection of interest, and/or adjusted based on other factors. The field of view 410 of one or more of the vision components can be adjusted to ensure the images that capture the intersection of interest 400 include one or more the traffic lights 421-423.

In some implementations, images of the intersection of interest 400 are only processed if the autonomous vehicle is within a threshold distance of the intersection of interest 400. The distance to the intersection of interest 400 can be determined based by comparing a location of the autonomous vehicle (e.g., determined based on a pose instance of the autonomous vehicle) with respect to the environment of the autonomous vehicle to a location of the entry point 404 of the intersection of interest 400. In some versions of those implementations, the threshold distance may be a pre-defined distance (e.g., within 125 feet, 150 feet, 300 feet, and/or other pre-defined distances to the intersection of interest 400). In other versions of those implementations, the threshold distance may be a dynamic distance that is based on a speed of the autonomous vehicle, weather conditions in an environment of the autonomous vehicle, and/or other factors. For example, if the autonomous vehicle is travelling at high rate of speed or if it is raining, then the threshold distance may be greater than if the autonomous vehicle is travelling at a lower rate of speed or if there are safer driving conditions.

In some additional and/or alternative versions of those implementations, a given one of the traffic lights included in the images are only processed if the given one of the traffic lights is within a threshold range of orientation with respect to the autonomous vehicle. The orientation of the given one of the traffic lights with respect to the autonomous vehicle can be determined by comparing an orientation of the autonomous vehicle (e.g., determined based on a pose instance of the autonomous vehicle) with respect to the environment of the autonomous vehicle to a surface normal of the entry point 404 of the intersection of interest 400. In some versions of those implementations, the threshold range of orientation may be a pre-defined range of orientation (e.g., within +/−15 degrees, +/−30 degrees, +/−45 degrees, and/or other ranges of orientations with respect to an orientation of the autonomous vehicle). In some other versions of those implementations, the threshold range of orientation may be a dynamic range of orientation that is based on an orientation of the autonomous vehicle, weather conditions in an environment of the autonomous vehicle, and/or other factors. For example, if the autonomous vehicle is changing lanes in the intersection, such that one or more of the vision components of the autonomous vehicle are not perpendicular to the intersection of interest, then the threshold range of orientation for the traffic light(s) may be adjusted to account for the orientation of the autonomous vehicle. As another example, if there are high winds in the environment of the autonomous vehicle, then the threshold range of orientation may be greater than if there is no wind (e.g., +/−30 degrees as opposed to +/−15 degrees). By using the threshold distance and/or the threshold range of orientation, processing of images can be restricted to those image(s) that capture traffic light(s) of the intersection of interest 400 (opposed to other intersections in the distance) and for the correct direction of travel (opposed to traffic lights that control other directions of travel), thereby allowing the autonomous vehicle to perceive the correct intersection.

In some implementations, image(s) captured by one or more vision components of the autonomous vehicle can include multiple traffic lights. For example, if one or more of the vision component of the autonomous vehicle captures an image that includes the field of view 410, then the captured image will include each of the traffic lights 421-423 of the intersection of interest 400. In some versions of those implementations, the image can be cropped based on region(s) in the image that are predicted to include the traffic lights 421-423. The region(s) that are predicted to include the can be determined based on the stored poses of the traffic lights 421-423 and using one or more geometric transformation techniques. For example, a region predicted to include the first traffic light 421 in the image corresponding to the field of view 410 can be determined using one or more geometric transformation techniques to the area 411 assigned to the first traffic light 421 and/or the height $H_1$ and width $W_1$ of the first traffic light 421 given a pose instance of the autonomous vehicle.

In some further versions of those implementations, the image can be cropped based on a predetermined size (e.g., 64×64, 96×96, and/or other predetermined sizes), and can be centered about the region(s) predicted to include the given one of the traffic lights 421-423. For example, with respect to the first traffic light 421, a centroid of the area 411 and/or a midpoint of the height $H_1$ and width $W_1$ of the first traffic light 421 can be used as a center for cropping the image. In some other versions of those implementations, the image can be cropped based on a dynamic size that includes the area 411 and/or the height $H_1$ and width $W_1$ of the first traffic light 421. The image can optionally be cropped with a buffer region of pixels surrounding the area 411 and/or the height $H_1$ and width $W_1$ of the first traffic light 421. For example, with respect to the first traffic light 421, the first area 411 (and optionally a buffer region surrounding the area 411) and/or the height $H_1$ and width $W_1$ of the first traffic light 421 (and optionally a buffer region surrounding the height $H_1$ and width $W_1$) can be cropped from the image. Notably, for images that are cropped based on the dynamic size, the resulting cropped images may be of various sizes as a function of the traffic light sizes and configurations. In some further versions of those implementations, the images may also be transformed prior to subsequent processing of the images. For example, in implementations where the images are cropped based on the dynamic size, the images can be re-sized prior to be processed. As another example, an image that includes a horizontal traffic light can be rotated to appear vertical prior to processing. As yet another example, occluded pixels can be interpolated to provide more vision data related to the bulbs of the traffic light prior to processing. The images can be processed using a machine learning classifier to generate predicted output(s) associated with candidate states of the traffic lights 421-423 as discussed in greater detail above (e.g., with respect to FIGS. 2A and 2B).

The current state of the traffic lights 421-423 can be selected based on processing the predicted output(s) generated using the machine learning classifier(s), and can include, for example, a red arrow (RA) state, a yellow arrow (YA) state, a green arrow (GA) state, a red (R) state, a yellow (Y) state, or a green (G) state. Further, the current state of the traffic lights 421-423 can also be associated with one or more control sets. A state of the intersection of interest 400 can be determined when a current state for each of the control sets associated with the traffic lights 421-423 is determined. For example, assume the selected current state associated with the first traffic light 421 is the red (R) state, the selected current state associated with the second traffic light 422 is the red (R) state, and the selected current state associated with the third traffic light 423 is the green arrow (GA) state. This indicates that the left turn action, the U-turn action, and the pass through actions cannot be taken at the intersection of interest 400, but that the right turn action can be taken at the intersection of interest 400 based on the control sets 440L, 440M, 440R. As another example, assume the selected current state associated with the first traffic light 421 is the red (R) state, the selected current state associated with the second traffic light 422 is the green (G) state, and the selected current state associated with the third traffic light 423 is both the green (G) state and the green arrow (GA) state. This indicates that the left turn action and the U-turn action cannot be taken at the intersection of interest 400, but that pass through action the right turn action can be taken at the intersection of interest 400 based on the control sets 440L, 440M, 44R. Notably, as illustrated in this example, the current state can include multiple states for different control sets (e.g., the green state for the main control set 440M and the green arrow state for the right control set 440R). Moreover, the current states of each of the traffic lights 421-423 and the associated control sets 440L, 440M, 440R can be transmitted to various other subsystems (e.g., perception subsystem 156, planning subsystem 158, and/or control subsystem 160) for use in controlling the autonomous vehicle. For example, planning subsystem 158 can plan a route for the autonomous vehicle, and can select a desired one of the current states of each of the traffic lights 421-423 and the associated control sets 440L, 440M, 440R based on the planned route for the autonomous vehicle.

Figure 5:
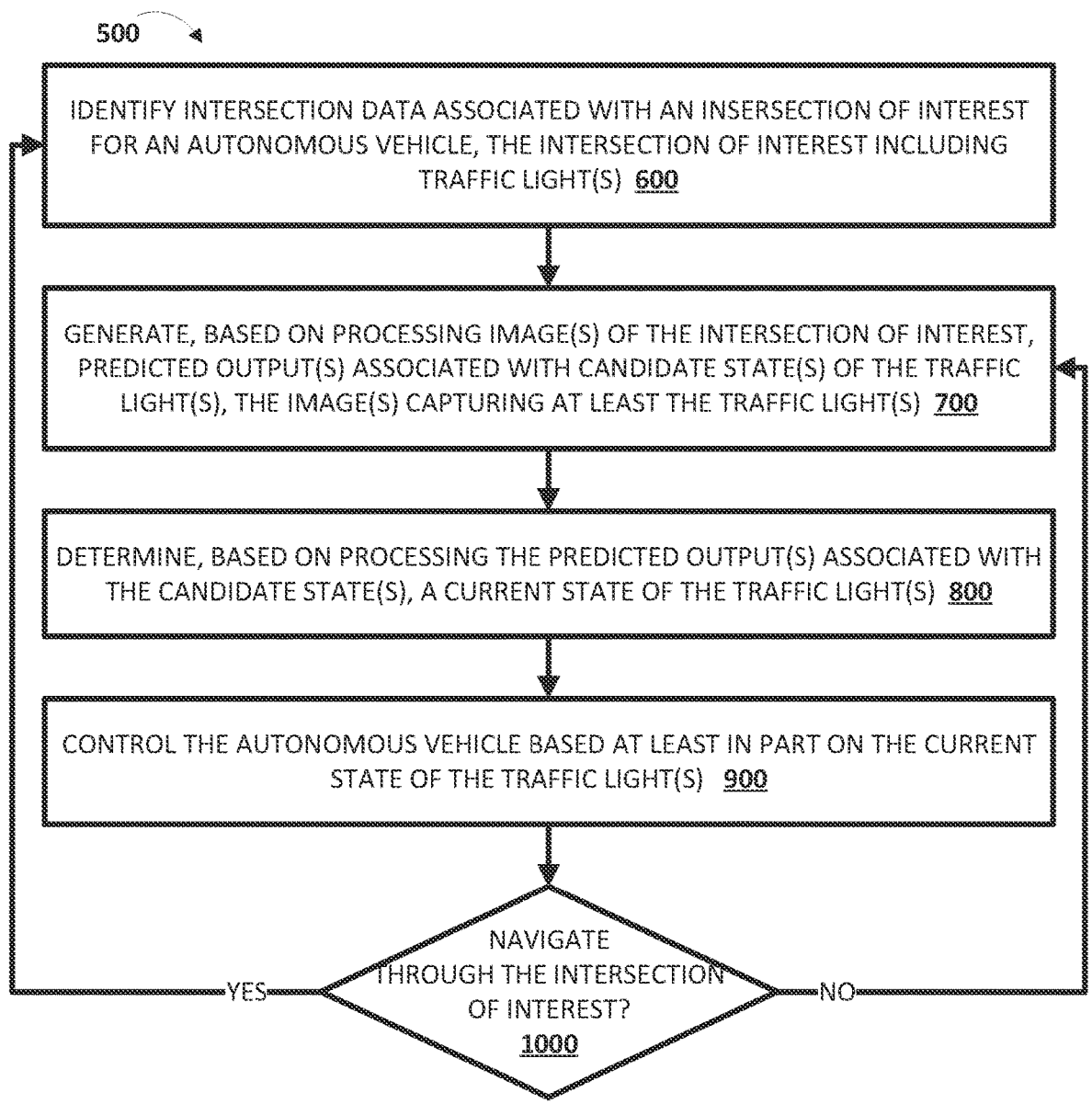
FIG. 5 is flowchart illustrating an example method of controlling an autonomous vehicle based on a current state of traffic light(s) of an intersection of interest for the autonomous vehicle, in accordance with various implementations.
Figure 6:
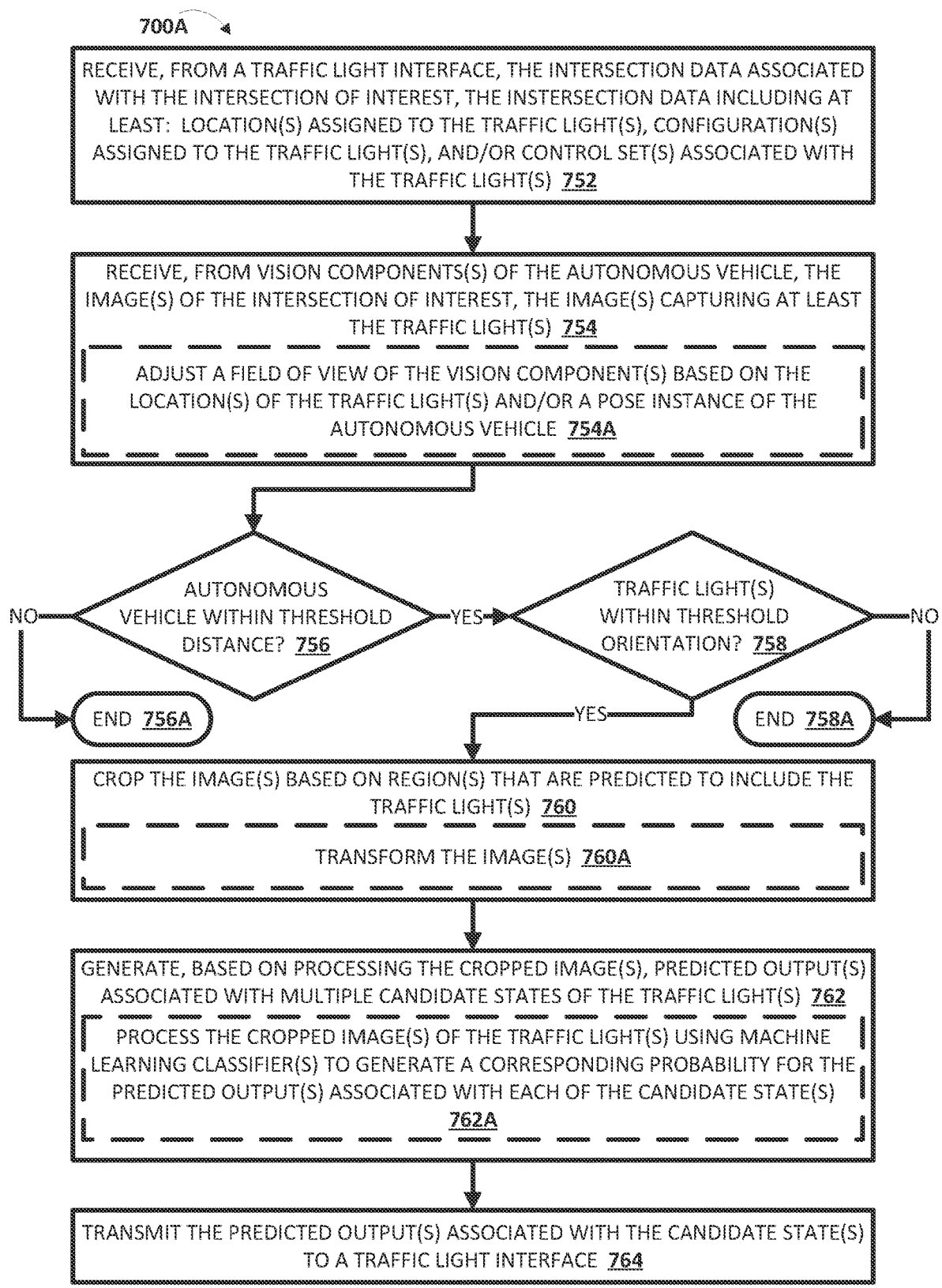
FIG. 6 is flowchart illustrating an example method of determining candidate state(s) of the traffic light(s) of the intersection of interest for the autonomous vehicle of FIG. 5, in accordance with various implementations.

Turning now to FIG. 5, an example method 500 of controlling an autonomous vehicle based on a current state of traffic light(s) of an intersection of interest for the autonomous vehicle is illustrated. The method 500 may be performed by an autonomous vehicle analyzing sensor data generated by sensor(s) of the autonomous vehicle (e.g., vehicle 100 of FIG. 1), by another vehicle (autonomous or otherwise), sensor data generated by another computer system that is separate from the autonomous vehicle, and/or some combination thereof. For the sake of simplicity, operations of the method 500 are described herein as being performed by a system (e.g., processor(s) 122 or primary vehicle control system 120, processor(s) of secondary vehicle control system 170, and/or a combination thereof). Moreover, some operations of method 500 of FIG. 5 are described herein with respect to method 700A of FIG. 6. It will be appreciated that the operations of the methods of FIGS. 5 and 6 may be varied, and that some operations may be performed in parallel and/or iteratively in some implementations, so the methods illustrated in FIGS. 5 and 6 are merely provided for illustrative purposes.

At block 600 of FIG. 5, the system identifies intersection data associated with an intersection of interest for an autonomous vehicle, the intersection of interest including traffic light(s). The system can identify the intersection of interest based on location and/or orientation information included in pose instance(s) of the autonomous vehicle, and can identify the intersection data that is stored in association with the intersection of interest. The intersection of interest and the intersection data are described in greater detail herein (e.g., with respect to FIGS. 2A and 4).

At block 700, the system generates, based on processing image(s) of the intersection of interest, predicted output(s) associated with candidate state(s) of the traffic light(s), the image(s) capturing region(s) that are predicted to include the traffic light(s). More particularly, the system can generate the predicted output(s) associated with the candidate state(s) of the traffic light(s) using traffic light state estimator 154B of traffic light subsystem 154. As one non-limiting example, FIG. 6 shows an example method 700A of how the system generates the predicted output(s) at block 700 of FIG. 5.

At block 752, the system receives, from a traffic light interface, intersection data associated with an intersection of interest, the intersection data including at least: location(s) (or pose(s)) assigned to the traffic light(s), configuration(s) assigned to the traffic light(s), and/or control set(s) associated with the traffic light(s). The traffic light interface can be, for example, implemented by traffic light subsystem 154 of primary vehicle control system 120 along with a traffic light state estimator, secondary vehicle control system 170 distinct from the traffic light state estimator, and/or by remote system(s) in communication with the autonomous vehicle and distinct from the traffic light state estimator.

At block 754, the system receives, from vision component(s) of the autonomous vehicle, the image(s) of the intersection of interest, the image(s) capturing at least the traffic light(s). The image(s) can include, for example, raw image data, RGB image(s), YUV images, black and white images, greyscale images, and/or other types of images that optionally include a depth component. Further, the image(s) may be a portion of a stream of images captured via vision component(s) of the autonomous vehicle. In some implementations, the image(s) may be annotated with metadata that includes an indication of the vision component(s) that captured the image(s). For example, a first vision component of the autonomous vehicle may capture a first stream of images of the intersection and each of the images in the first stream may be annotated with metadata to indicate it was captured by the first vision sensor, a second vision component of the autonomous vehicle may capture a second stream of images of the intersection and each of the images in the second stream may be annotated with metadata to indicate it was captured by the second vision sensor, and so on.

In some implementations, the method 700A may further include optional sub-block 754A. At optional sub-block 754A, the system may adjust a field of view of the vision component(s) based on the location(s) of the traffic light(s) and/or a pose instance of the autonomous vehicle. For example, if the pose instance indicates that the autonomous vehicle is near an entry point of the intersection, then a field of view of the vision component(s) may need to be adjusted to capture further the image(s) and/or further image(s) of the intersection that include the traffic light(s). As another example, if the location(s) assigned to the traffic light(s) in the intersection data indicates a traffic light has an abnormal height (e.g., above or below a threshold range of height)

and/or is located in an abnormal position (e.g., anywhere other than directly above the intersection), then a field of view of the vision component(s) may need to be adjusted to capture the image(s) and/or further image(s) of the intersection that include the traffic light(s).

At block 756, the system determines whether the autonomous vehicle is within a threshold distance of the intersection of interest. The system can determine a distance to the intersection by comparing a location of the autonomous vehicle to a location of an entry point of the intersection of interest (e.g., determined based on the intersection data associated with the intersection of interest). If, at an iteration of block 756, the system determines that the autonomous vehicle is not within the threshold distance of the intersection of interest, then the system may proceed to block 756A and the method 700A may end. However, at an iteration of block 758, if the system determines that the autonomous vehicle is within the threshold distance of the intersection of interest, then the system may proceed to block 758.

At block 758, the system determines whether the traffic light(s) are within a threshold range of orientation with respect to the autonomous vehicle. The system can determine an orientation of the traffic light(s) with respect to the autonomous vehicle by comparing an orientation of the autonomous vehicle to a stored pose of the traffic light(s) included in the intersection data and/or a surface normal of an entry point of the intersection of interest included in the intersection data. If, at an iteration of block 758, the system determines that the traffic light(s) is not within the threshold range of orientation of the autonomous vehicle, then the system may proceed to block 758A and the method 700A may end. By using the threshold distance at block 756 and the threshold range of orientation at block 758, the system may restrict processing of image(s) to those image(s) that capture traffic light(s) of the intersection of interest at relevant distances, thereby allowing the autonomous vehicle to perceive the correct intersection for a given iteration of the method 700A. However, at an iteration of block 758, if the system determines that traffic light(s) are within the threshold range of orientation of the autonomous vehicle, then the system may proceed to block 760.

At block 760, the system crops the image(s) based on region(s) that are predicted to include the traffic light(s). The region(s) that are predicted to include the traffic light(s) can be determined based on stored pose instance(s) and/or location(s) of the traffic light(s) included in the intersection data associated with the intersection of interest. In some implementations, the method 700A may further include optional sub-block 760A. At optional sub-block 760A, the system may transform the image(s). The system may use one or more image transformation techniques to normalize the image(s) and/or the cropped image(s). More particularly, the system may use the image transformation techniques to modify the image(s) and/or the cropped image(s) to make them appear as if they are from a front view perspective of the traffic light(s) as discussed above with respect to FIGS. 2A, 3, and 4.

At block 762, the system generates, based on processing the cropped image(s), predicted output(s) associated with multiple candidate state(s) of the traffic light(s). In some implementations, the system determines predicted output(s) associated with the candidate state(s) for each of the traffic light(s) of the intersection. In some versions of those implementations, the system can determine which of the traffic light(s) influence control of the autonomous vehicle downstream of traffic light subsystem 154 (e.g., based on planning stage from planning subsystem 158). In some additional and/or alternative implementations, the system may know which of the traffic light(s) influence control of the autonomous vehicle, and the system may only determine predicted output(s) associated with the candidate state(s) for each of the traffic light(s) that influence the control of the autonomous vehicle.

In some implementations, the method 700A may further include optional sub-block 762A. At optional sub-block 762A, the system may process the cropped image(s) of the traffic light(s) using machine learning (ML) classifier(s) (e.g., as discussed in greater detail with respect to ML classifier(s) 264AN of FIGS. 2A, 2B, and 3) to generate a corresponding probability for the predicted output(s) associated with the candidate state(s). In some versions of those implementations, the corresponding probability for the predicted output(s) is a feature vector that includes a probability that a current state of the traffic light(s) is a current state of the traffic light. In some further versions of those implementations, the system may process the configuration(s) of the traffic light(s) along with the cropped image(s) to generate the corresponding probability for the predicted output(s) associated with the candidate state(s). In some additional and/or alternative versions of those implementations, the system may select a given ML classifier, from among a plurality of ML classifiers based on the configuration(s) of the traffic light. Notably, the system may select different ML classifiers for traffic lights included in the same image. Moreover, although the method 700A of FIG. 6 is described herein as generating the corresponding probabilities, it should be understood that is for the sake of example and is not meant to be limiting. For example, the ML classifier(s) can be trained to generate various numerical measures as predicted output as described in more detail above (e.g., with respect to FIGS. 2A, 2B, and 3).

At block 764, the system transmits the predicted output(s) associated with the candidate state(s) to a traffic light interface. The traffic light interface can be, for example, implemented by traffic light subsystem 154 of primary vehicle control system 120 along with a traffic light state estimator, secondary vehicle control system 170 distinct from the traffic light state estimator, and/or by remote system(s) in communication with the autonomous vehicle and distinct from the traffic light state estimator.

Referring back to FIG. 5, at block 800, the system determines, based on processing the predicted output(s) associated with the candidate state(s), a current state of the traffic light(s). The system can determine the current state of the traffic light(s) using traffic light model(s) as discussed in greater detail herein (e.g., with respect to FIGS. 2A, 2B, and 3).

At block 900, the system controls the autonomous vehicle based at least in part on the current state of the traffic light(s). For example, for the intersection of interest, the system may transmit the current state of the traffic light(s) of the intersection of interest to a planning subsystem for use in planning a route through the intersection if not previously determined. As another example, the system may transmit the current state of the traffic light(s) of the intersection of interest to a control subsystem for use in controlling a drivetrain of the autonomous vehicle to take a desired action. In some implementations, the system can transmit the current state of the traffic light(s) to other autonomous vehicles in the environment of the autonomous vehicle and/or remote system(s). In some versions of those implementations, the other autonomous vehicles in the environment of the autonomous vehicle may utilize the current state of the traffic light(s) in controlling the other autonomous vehicles. For example, assume a first autonomous vehicle is at an entry point of the intersection and can process image(s) of a given traffic light to determine a current state of the given traffic light indicates a main control set is in a red state, and further assume a second autonomous vehicle is further away from the entry point of the intersection such that the given traffic light is occluded from view of vision component(s) of the second autonomous vehicle. In this example, the first autonomous vehicle can transmit the red state associated with the main control set of the intersection to the second autonomous vehicle. The second autonomous vehicle may then use the red state associated with the main control set in various subsystems.

At block 1000, the system determines whether the autonomous vehicle has navigated through the intersection of interest. If, at an iteration of block 1000, the system determines that the autonomous vehicle has not navigated through the intersection of interest, then the system may return to block 700 and continue with the method 500. In this manner, the system can continue processing a stream of images of the intersection of interest to generate further predicted output(s) associated with the candidate state(s) of the traffic light(s), determining the current state of the traffic light(s) based on the further predicted output(s), and controlling the autonomous vehicle based at least in part on the current state of the traffic light(s) until the autonomous vehicle successfully navigates through the intersection of interest. However, at an iteration of block 1000, if the system determines that the autonomous vehicle has navigated through the intersection of intersection, then the system may return to block 600 to identify further intersection data associated with a next intersection of interest for the autonomous vehicle.

It should be understood that the operations of FIGS. 5 and 6 described herein may be utilized to determine a current state of a plurality of traffic lights and their associated control sets sequentially and/or in parallel. Moreover, it should be understood that multiple iterations of the operations of FIGS. 5 and 6 may be performed in parallel for the sake of redundancy. As noted above, it should also be understood that the operations of FIGS. 5 and 6 can be performed by a remote computing system (e.g., server-based and/or cloud-based implementations). For example, the sensor data and the image(s) generated by the autonomous vehicle can be transmitted to the remote computing system over one or more networks, and the remote computing system can process the sensor data and transmit information back to the autonomous vehicle over one or more of the networks. The information can include, for example, the pose instances, the intersection data, the predicted output(s) associated with each of the multiple candidate states, the current state of the traffic light(s), control commands for the autonomous vehicle, and/or any other information described herein. For instance, the autonomous vehicle can transmit the image(s) to the remote computing system, the remote computing system can process the image(s) along with the intersection data to select the current state of one or more traffic lights captured in the image(s), and the autonomous vehicle can determine one or more actions that can be taken based on the selected current state of one or more of the traffic lights. As another example, the remote computing system can send one or more control commands to the autonomous vehicle based on the selected current state of one or more of the traffic lights.

Other variations will be apparent to those of ordinary skill. Therefore, the invention lies in the claims hereinafter appended.

What is claimed is:

1. A method implemented by one or more processors, the method comprising:
generating a plurality of training instances, each of the plurality of training instances including a training instance input and a corresponding training instance output,
wherein the training instance input includes vision data capturing a traffic light, and includes a configuration indication that corresponds to a configuration that is assigned to the traffic light,
wherein the configuration that is assigned to the traffic light is one of multiple disparate configurations in a taxonomy of configurations,
wherein the configuration that is assigned to the traffic light defines an orientation of the traffic light and a bulb pattern of the traffic light, and
wherein the bulb pattern of the traffic light defines a placement of a plurality of bulbs of the traffic light relative to one another, and
wherein the corresponding training instance output includes a ground truth state of the traffic light; and
training a machine learning classifier, for subsequent use by an autonomous vehicle, based on the plurality of training instances, the machine learning classifier being selected, from among a plurality of candidate machine learning classifiers each associated with a corresponding one of the multiple disparate configurations in the taxonomy of configurations, to process an image of a given traffic light captured during the subsequent use in an environment of the autonomous vehicle and assigned the configuration.

2. The method of claim 1, further comprising:
generating a plurality of additional training instances, each of the plurality of additional training instances including an additional training instance input and a corresponding additional training instance output,
wherein the additional training instance input includes additional vision data capturing an additional traffic light, and includes an additional configuration indication that corresponds to an additional configuration that is assigned to the additional traffic light, and
wherein the corresponding additional training instance output includes an additional ground truth state of the additional traffic light; and
training an additional machine learning classifier, for subsequent use by the autonomous vehicle, based on the plurality of additional training instances.

3. The method of claim 2, wherein the additional configuration that is assigned to the additional traffic light is an additional one of the multiple disparate configurations in the taxonomy of configurations, and wherein the additional configuration that is assigned to the additional traffic light is distinct from the configuration assigned to the traffic light.

4. The method of claim 3, further comprising:
subsequent to training the machine learning classifier and the additional machine learning classifier:
receiving, from one or more vision components of the autonomous vehicle, an image that captures a given traffic light; and
controlling the autonomous vehicle based on a current state of the given traffic light included in the image.

5. The method of claim 4, further comprising:
determining whether a given configuration assigned to the given traffic light corresponds to the configuration or the additional configuration; and in response to determining that the given configuration assigned to the given traffic light corresponds to the configuration:
selecting the machine learning classifier to process the received image that captures the given traffic light;
generating, based on processing the received image using the machine learning classifier, predicted output associated with multiple candidate states of the given traffic light; and
selecting, based on the predicted output, one of the multiple candidate states as a current state of the given traffic light.

6. The method of claim 4, further comprising:
determining whether a given configuration assigned to the given traffic light corresponds to the configuration or the additional configuration; and
in response to determining that the given configuration assigned to the given traffic light corresponds to the additional configuration:
selecting the additional machine learning classifier to process the received image that captures the given traffic light;
generating, based on processing the received image using the additional machine learning classifier, predicted output associated with multiple candidate states of the given traffic light; and
selecting, based on the predicted output, one of the multiple candidate states as the current state of the given traffic light.

7. The method of claim 4, further comprising:
identifying a given configuration assigned to the given traffic light;
generating, based on processing the received image using the machine learning classifier along with a given configuration indication that corresponds to the given configuration, predicted output associated with multiple candidate states of the given traffic light; and
selecting, based on the predicted output, one of the multiple candidate states as the current state of the given traffic light.

8. The method of claim 1, wherein the configuration indication that corresponds to the configuration that is assigned to the traffic light comprises a semantic indicator associated with the configuration that is assigned to the traffic light.

9. The method of claim 1, wherein the machine learning classifier is a convolutional neural network.

10. The method of claim 1, wherein the ground truth state of the traffic light is one of multiple candidate states of the traffic light, and wherein the multiple candidate states of the traffic light comprise two or more of a first state indicative of a red state of the traffic light, a second state indicative of a yellow state of the traffic light, a third state indicative of a green state of the traffic light, a fourth state indicative of an off state of the traffic light, or a fifth state indicative of a not visible state of the traffic light.

11. A system, the system comprising:
at least one processor; and
memory comprising instructions that, when executed, cause the at least one processor to:
generate a plurality of training instances, each of the plurality of training instances including a training instance input and a corresponding training instance output,
wherein the training instance input includes vision data capturing a traffic light, and includes a configuration indication that corresponds to a configuration that is assigned to the traffic light,
wherein the configuration that is assigned to the traffic light is one of multiple disparate configurations in a taxonomy of configurations,
wherein the configuration that is assigned to the traffic light defines an orientation of the traffic light and a bulb pattern of the traffic light, and
wherein the bulb pattern of the traffic light defines a placement of a plurality of bulbs of the traffic light relative to one another, and
wherein the corresponding training instance output includes a ground truth state of the traffic light; and
train a machine learning classifier, for subsequent use by an autonomous vehicle, based on the plurality of training instances, the machine learning classifier being selected, from among a plurality of candidate machine learning classifiers each associated with a corresponding one of the multiple disparate configurations in the taxonomy of configurations, to process an image of a given traffic light captured during the subsequent use in an environment of the autonomous vehicle and assigned the configuration.

12. The system of claim 11, wherein the instructions further cause the at least one processor to:
generate a plurality of additional training instances, each of the plurality of additional training instances including an additional training instance input and a corresponding additional training instance output,
wherein the additional training instance input includes additional vision data capturing an additional traffic light, and includes an additional configuration indication that corresponds to an additional configuration that is assigned to the additional traffic light, and
wherein the corresponding additional training instance output includes an additional ground truth state of the additional traffic light; and
train an additional machine learning classifier, for subsequent use by the autonomous vehicle, based on the plurality of additional training instances.

13. The system of claim 12, wherein the additional configuration that is assigned to the additional traffic light is an additional one of the multiple disparate configurations in the taxonomy of configurations, and wherein the additional configuration that is assigned to the additional traffic light is distinct from the configuration assigned to the traffic light.

14. The system of claim 13, wherein the instructions further cause the at least one processor to:
subsequent to training the machine learning classifier and the additional machine learning classifier:
receive, from one or more vision components of the autonomous vehicle, an image that captures a given traffic light; and
control the autonomous vehicle based on a current state of the given traffic light included in the image.

15. The system of claim 14, wherein the instructions further cause the at least one processor to:
determine whether a given configuration assigned to the given traffic light corresponds to the configuration or the additional configuration; and
in response to determining that the given configuration assigned to the given traffic light corresponds to the configuration:
select the machine learning classifier to process the received image that captures the given traffic light;

generate, based on processing the received image using the machine learning classifier, predicted output associated with multiple candidate states of the given traffic light; and select, based on the predicted output, one of the multiple candidate states as a current state of the given traffic light.

16. The system of claim 14, wherein the instructions further cause the at least one processor to:

determine whether a given configuration assigned to the given traffic light corresponds to the configuration or the additional configuration; and in response to determining that the given configuration assigned to the given traffic light corresponds to the additional configuration:

select the additional machine learning classifier to process the received image that captures the given traffic light;

generate, based on processing the received image using the additional machine learning classifier, predicted output associated with multiple candidate states of the given traffic light; and select, based on the predicted output, one of the multiple candidate states as the current state of the given traffic light.

17. The system of claim 14, wherein the instructions further cause the at least one processor to:

identify a given configuration assigned to the given traffic light;

generate, based on processing the received image using the machine learning classifier along with a given configuration indication that corresponds to the given configuration, predicted output associated with multiple candidate states of the given traffic light; and select, based on the predicted output, one of the multiple candidate states as the current state of the given traffic light.

18. The system of claim 11, wherein the ground truth state of the traffic light is one of multiple candidate states of the traffic light, and wherein the multiple candidate states of the traffic light comprise two or more of a first state indicative of a red state of the traffic light, a second state indicative of a yellow state of the traffic light, a third state indicative of a green state of the traffic light, a fourth state indicative of an off state of the traffic light, or a fifth state indicative of a not visible state of the traffic light.

* * * * *